(12) United States Patent
Yoshizawa et al.

(10) Patent No.: US 12,445,674 B2
(45) Date of Patent: *Oct. 14, 2025

(54) BROADCAST RECEPTION DEVICE, BROADCAST RECEPTION METHOD, AND BROADCAST RECEPTION PROGRAM

(71) Applicant: MAXELL, LTD., Kyoto (JP)

(72) Inventors: Kazuhiko Yoshizawa, Osaka (JP); Nobuo Masuoka, Osaka (JP); Hiroshi Shimizu, Osaka (JP); Yasunobu Hashimoto, Osaka (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,788

(22) Filed: Mar. 26, 2024

(65) Prior Publication Data
US 2024/0236405 A1 Jul. 11, 2024

Related U.S. Application Data

(63) Continuation of application No. 18/077,556, filed on Dec. 8, 2022, now Pat. No. 11,974,009, which is a
(Continued)

(51) Int. Cl.
*H04N 21/433* (2011.01)
*H04N 5/775* (2006.01)
(Continued)

(52) U.S. Cl.
CPC ......... *H04N 21/4334* (2013.01); *H04N 5/775* (2013.01); *H04N 5/91* (2013.01);
(Continued)

(58) Field of Classification Search
USPC .......................................................... 386/241
See application file for complete search history.

(56) References Cited

U.S. PATENT DOCUMENTS 5,589,892 A 12/1996 Knee
5,751,282 A 5/1998 Girard
(Continued)

FOREIGN PATENT DOCUMENTS

JP 2002-135699 A 5/2002
JP 2004-159318 A 6/2004
(Continued)

OTHER PUBLICATIONS

International Search Report of PCT/JP2014/077389 dated Jan. 20, 2015.
(Continued)

*Primary Examiner* — Nigar Chowdhury
(74) *Attorney, Agent, or Firm* — Mattingly & Malur, PC

(57) ABSTRACT

A broadcast reception device includes: a program recording execution unit that stores, into a recording-content storage area, program identification information for identifying a broadcast program, and storage-destination information for specifying a server device storing the broadcast program; a reception function execution unit that transmits the program identification information and the program storage-destination information to the server device specified from the program storage-destination information; and an output unit that outputs sound information and image information on the broadcast program transmitted from the server device.

6 Claims, 19 Drawing Sheets

| PROGRAM ID | CONTENT STORAGE LOCATION | CONTENT NAME |
|---|---|---|
| MX001001 | /MXL/drama/drama1024/20140617/ | Program00001001.TS |
| MX001002 | NULL | |
| MX001003 | /MXL /cinema/cinema0512/20140617/ | Program00001003.TS |
| MX001004 | NULL | |
| ... | ... | ... |

4201 4202 4203

| CONTENT TITLE | CATEGORY | BROADCAST DATE | BROADCAST TIME | CONTENT OUTLINE |
|---|---|---|---|---|
| "SEE YOU AT SAKURAGI TOWN" | DRAMA | 2014/06/17 | 20:00-20:54 | 「..............」 |
| "NEWS BEFORE 21 O' CLOCK" | NEWS | 2014/06/17 | 20:54-21:00 | 「..............」 |
| "FRIDAY ROAD SHOW" | MOVIE | 2014/06/17 | 21:00-22:54 | 「..............」 |
| "TOMORROW' S WEATHER" | NEWS | 2014/06/17 | 22:54-23:00 | 「..............」 |
| ... | ... | ... | ... | ... |

4204 4205 4206 4207 4208

Related U.S. Application Data continuation of application No. 16/680,853, filed on Nov. 12, 2019, now Pat. No. 11,553,241, which is a continuation of application No. 15/518,059, filed as application No. PCT/JP2014/077389 on Oct. 15, 2014, now Pat. No. 10,523,997.

(51) Int. Cl.

| | | |
|---|---|---|
| H04N 5/91 | (2006.01) | |
| H04N 21/226 | (2011.01) | |
| H04N 21/235 | (2011.01) | |
| H04N 21/258 | (2011.01) | |
| H04N 21/2747 | (2011.01) | |
| H04N 21/435 | (2011.01) | |
| H04N 21/441 | (2011.01) | |
| H04N 21/472 | (2011.01) | |
| H04N 21/658 | (2011.01) | |
| H04N 21/84 | (2011.01) | |

(52) U.S. Cl.
CPC ....... *H04N 21/2265* (2013.01); *H04N 21/235* (2013.01); *H04N 21/2353* (2013.01); *H04N 21/25875* (2013.01); *H04N 21/2747* (2013.01); *H04N 21/435* (2013.01); *H04N 21/441* (2013.01); *H04N 21/47214* (2013.01); *H04N 21/6581* (2013.01); *H04N 21/84* (2013.01)

(56) References Cited

U.S. PATENT DOCUMENTS

| | | | |
|---|---|---|---|
| 5,822,123 A | 10/1998 | Davis | |
| 5,977,962 A | 11/1999 | Chapman | |
| 6,311,011 B1 | 10/2001 | Kuroda | |
| 6,414,720 B1 | 7/2002 | Tsukidate | |
| 6,505,348 B1 | 1/2003 | Knowles | |
| 8,028,316 B2 | 9/2011 | Kawai | |
| 8,281,344 B1 | 10/2012 | Mathias | |
| 8,577,411 B2 | 11/2013 | Adachi et al. | |
| 8,739,234 B1 | 5/2014 | Cheung | |
| 8,904,444 B2 | 12/2014 | Kannan | |
| 9,532,111 B1 | 12/2016 | Christie | |
| 9,998,783 B2 | 6/2018 | Walker | |
| 2002/0046407 A1 | 4/2002 | Franco | |
| 2002/0065036 A1 | 5/2002 | Sakata | |
| 2002/0174430 A1 | 11/2002 | Ellis | |
| 2002/0184635 A1 | 12/2002 | Istvan | |
| 2003/0005445 A1 | 1/2003 | Schein | |
| 2003/0023987 A1 | 1/2003 | Hiramoto | |
| 2003/0079222 A1 | 4/2003 | Boykin | |
| 2003/0112258 A1 | 6/2003 | Dietz | |
| 2003/0149641 A1 | 8/2003 | Kouketsu | |
| 2005/0105528 A1 | 5/2005 | Kobayashi | |
| 2005/0177858 A1 | 8/2005 | Ueda | |
| 2006/0044585 A1 | 3/2006 | Kaneko | |
| 2006/0159367 A1 | 7/2006 | Zeineh | |
| 2006/0212906 A1 | 9/2006 | Cantalini | |
| 2006/0250650 A1 | 11/2006 | Narahara | |
| 2006/0277272 A1 | 12/2006 | Cantalini | |
| 2007/0011704 A1 | 1/2007 | Anglin, Jr. | |
| 2007/0204299 A1 | 8/2007 | Vosseller | |
| 2007/0300253 A1 | 12/2007 | Kawai | |
| 2008/0040744 A1 | 2/2008 | Sukuki | |
| 2008/0155598 A1 | 6/2008 | Lee | |
| 2008/0170836 A1 | 7/2008 | Kinoshita | |
| 2008/0204358 A1 | 8/2008 | Sato | |
| 2009/0031431 A1 | 1/2009 | Boccon-Gibod | |
| 2009/0083322 A1 | 3/2009 | Relyea | |
| 2009/0199243 A1 | 8/2009 | Ogawa | |
| 2009/0204999 A1 | 8/2009 | Nakamura | |
| 2009/0274448 A1 | 11/2009 | Kinoshita | |
| 2009/0279847 A1 | 11/2009 | Kinoshita | |
| 2010/0023974 A1 | 1/2010 | Shiragaki | |
| 2010/0121936 A1 | 5/2010 | Liu | |
| 2010/0202597 A1 | 8/2010 | Koenigs | |
| 2010/0333137 A1 | 12/2010 | Hamano | |
| 2011/0019971 A1 | 1/2011 | Yamane | |
| 2011/0083150 A1 | 4/2011 | Kim | |
| 2011/0099263 A1 | 4/2011 | Patil | |
| 2011/0126223 A1 | 5/2011 | Shahraray | |
| 2011/0283232 A1 | 11/2011 | Jordan | |
| 2012/0106932 A1 | 5/2012 | Grevers, Jr. | |
| 2012/0246279 A1 | 9/2012 | Zang | |
| 2013/0038527 A1 | 2/2013 | Komai | |
| 2013/0055414 A1 | 2/2013 | Shibata | |
| 2013/0101266 A1 | 4/2013 | Chun | |
| 2013/0170819 A1 | 7/2013 | Dykeman | |
| 2013/0239172 A1 | 9/2013 | Murakami | |
| 2013/0247117 A1 | 9/2013 | Yamada | |
| 2013/0326562 A1 | 12/2013 | Bi | |
| 2014/0137152 A1 | 5/2014 | Adachi et al. | |
| 2014/0181853 A1 | 6/2014 | Dureau | |
| 2014/0250477 A1* | 9/2014 | Kang | H04N 21/42222 725/110 |
| 2014/0282654 A1 | 9/2014 | Wang | |
| 2014/0344846 A1 | 11/2014 | Yamamura | |
| 2015/0066887 A1* | 3/2015 | Takemura | H04N 21/4532 707/706 |
| 2015/0229981 A1* | 8/2015 | Williams | H04N 21/84 725/54 |
| 2015/0229987 A1* | 8/2015 | Kim | H04N 21/4668 725/34 |
| 2015/0237391 A1* | 8/2015 | Tsuji | H04N 21/4312 725/43 |
| 2016/0021157 A1 | 1/2016 | Duerring | |
| 2016/0353139 A1 | 12/2016 | Smith | |
| 2017/0366850 A1 | 12/2017 | Wellen | |
| 2018/0287808 A1 | 10/2018 | Liston | |
| 2019/0058921 A1 | 2/2019 | Christie | |

FOREIGN PATENT DOCUMENTS

| | | | |
|---|---|---|---|
| JP | 2004-304430 A | 10/2004 | |
| JP | 2006-25230 A | 1/2006 | |
| JP | 2008-118329 A | 5/2008 | |
| JP | 2008-289057 A | 11/2008 | |
| JP | 2010278788 A | 12/2010 | |
| JP | 2012-039417 A | 2/2012 | |
| JP | 2012-110050 A | 6/2012 | |
| JP | 2014-64308 A | 4/2014 | |
| WO | 2007/004392 A1 | 1/2007 | |

OTHER PUBLICATIONS

Japanese Office Action received in corresponding Japanese Application No. 2016-553781 dated Dec. 19, 2017.

Japanese Office Action received in corresponding Japanese Application No. 2018-155618 dated Apr. 23, 2019.

Chinese Office Action received in corresponding Chinese Application No. 201480082650.3 issued Jul. 23, 2019.

Japanese Office Action received in corresponding Japanese Application No. 2018-155618 dated Jan. 7, 2020.

\* cited by examiner

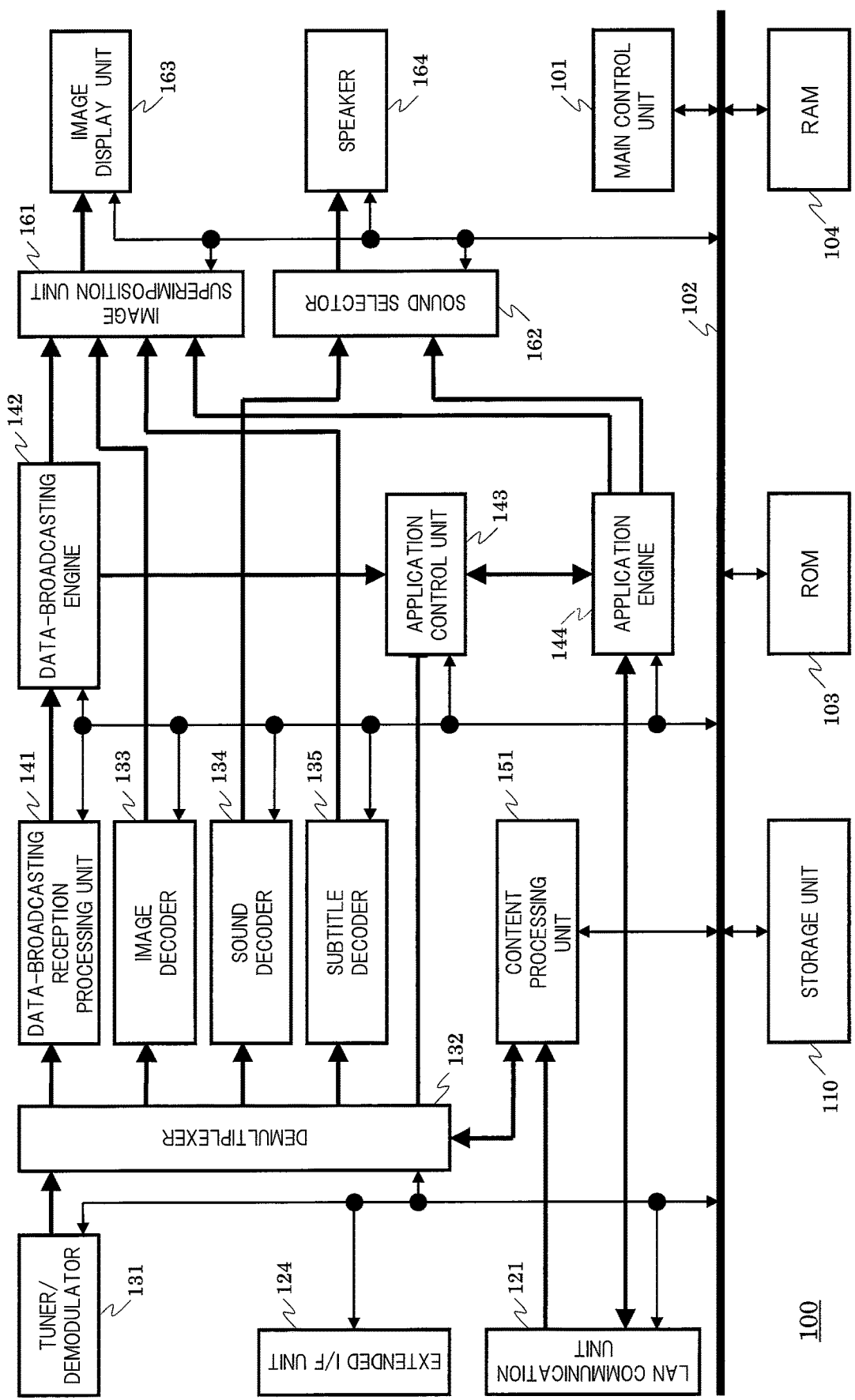

FIG. 2C

| No. | BROADCAST DATE | BROADCAST TIME | CH | PROGRAM TITLE | REPETITION | RECORDING/ VIEWING | RECORDING DESTINATION |
|---|---|---|---|---|---|---|---|
| 01 | 2014/06/24 | 20:00-20:54 | 8 | "SEE YOU AT SAKURAGI TOWN" | EVERY WEEK | DR | BUILT-IN HDD |
| 02 | 2014/06/25 | 08:00-08:15 | 1 | "HANAKO TO ANKO" | EVERY DAY | VIEWING | — |
| 03 | 2014/06/27 | 18:30-19:00 | 7 | "POT MONSTERS" | — | TSX8 | NETWORK |
| ... | ... | ... | ... | ... | ... | ... | ... |

| No. | RECORDING DATE | RECORDING TIME | CH | PROGRAM TITLE | RECORDING MODE | PROGRAM ID |
|---|---|---|---|---|---|---|
| 001 | 2014/06/10 | 20:00-20:54 | 8 | "SEE YOU AT SAKURAGI TOWN" | DR | MX000001 |
| 002 | 2014/06/17 | 20:00-20:54 | 8 | "SEE YOU AT SAKURAGI TOWN" | DR | MX001001 |
| 003 | 2014/06/20 | 19:00-20:00 | 6 | "DASH TO ARASHI!!" | TSX8 | TB001012 |
| ... | ... | ... | ... | ... | ... | ... |

1301 1302 1303 1304 1305 1306 1307

| No. | PROGRAM STORAGE-DESTINATION INFORMATION | RESUME |
|---|---|---|
| 001 | XXX.XXX.XXX.XXX/MXL/drama/drama1024/20140610/Program00000001.TS | 00:53:05 |
| 002 | XXX.XXX.XXX.XXX/MXL/drama/drama1024/20140617/Program00001001.TS | 00:00:00 |
| 003 | HDD0001/root/directory0001/Program00001012.TS | 00:00:00 |
| ... | ... | ... |

1301 1308 1309

| 4201 | 4202 | 4203 |
|---|---|---|
| PROGRAM ID | CONTENT STORAGE LOCATION | CONTENT NAME |
| MX001001 | /MXL/drama/drama1024/20140617/ | Program00001001.TS |
| MX001002 | NULL | |
| MX001003 | /MXL /cinema/cinema0512/20140617/ | Program00001003.TS |
| MX001004 | NULL | |
| ... | ... | ... |

| 4204 | 4205 | 4206 | 4207 | 4208 |
|---|---|---|---|---|
| CONTENT TITLE | CATEGORY | BROADCAST DATE | BROADCAST TIME | CONTENT OUTLINE |
| "SEE YOU AT SAKURAGI TOWN" | DRAMA | 2014/06/17 | 20:00-20:54 | 『..........』 |
| "NEWS BEFORE 21 0' CLOCK" | NEWS | 2014/06/17 | 20:54-21:00 | 『..........』 |
| "FRIDAY ROAD SHOW" | MOVIE | 2014/06/17 | 21:00-22:54 | 『..........』 |
| "TOMORROW' S WEATHER" | NEWS | 2014/06/17 | 22:54-23:00 | 『..........』 |
| ... | ... | ... | ... | ... |

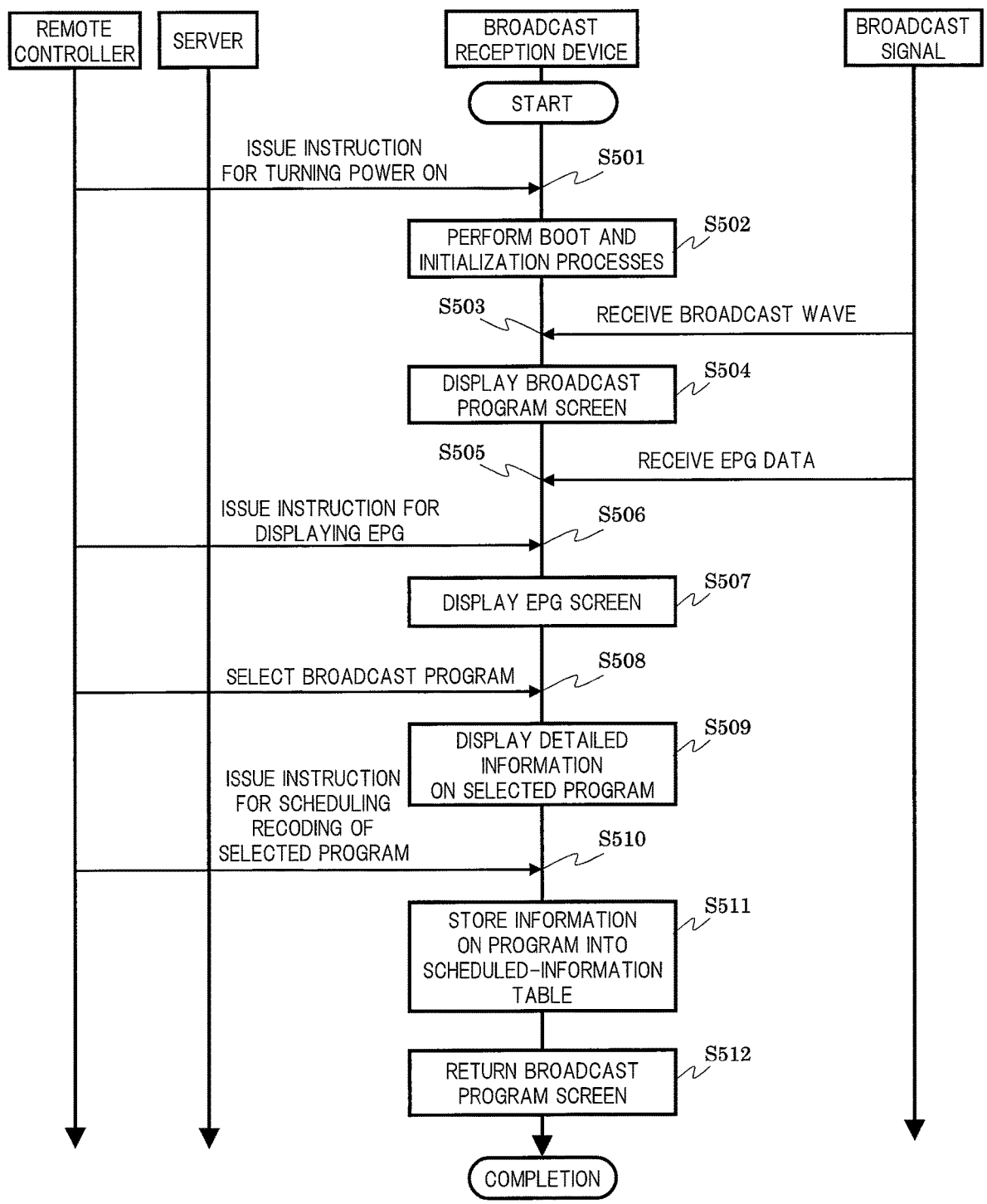

| No. | SERVICE NAME | ACCESS DESTINATION | LOGIN NAME | PASSWORD | CARD INFORMATION |
|---|---|---|---|---|---|
| 0001 | ○○ TV DISTRIBUTION | XXX.XXX.XXX.XXX | ○○ MARUO | ********* | XXXX-XXXX-XXXX-XXXX |
| 0002 | ☆☆ on VOD | YYY.YYY.YYY.YYY | ○○ MARUO | ********* | XXXX-XXXX-XXXX-XXXX |
| 0003 | DEMAND △△ | ZZZ.ZZZ.ZZZ.ZZZ | ○○ MARUO | ********* | XXXX-XXXX-XXXX-XXXX |
| ... | ... | ... | ... | ... | ... |

| No. | USER NAME | ASSOCIATED INFORMATION | PASSWORD | EXPIRATION DATE |
|---|---|---|---|---|
| 0000001 | ○○ MARUO | ○○ TOWN, ○○ CITY, ○○ PREFECTURE ········ | ********** | yy/mm/dd |
| 0000002 | ×× BATSURO | ×× TOWN, ×× WARD, ×× METROPOLITAN | ********** | yy/mm/dd |
| 0000003 | △△ SANKAKUKO | △△ TOWN, △△ CITY, △△ PREFECTURE | ********** | yy/mm/dd |
| ... | ... | ... | ... | ... |

4501, 4502, 4503, 4504, 4505

BROADCAST RECEPTION DEVICE, BROADCAST RECEPTION METHOD, AND BROADCAST RECEPTION PROGRAM

TECHNICAL FIELD

The present invention relates to a broadcast reception device, a broadcast reception method, and a broadcast reception program.

BACKGROUND ART

Recording devices, in each of which a broadcast program in digital broadcasting is stored in such a recording medium as an optical disc, or in such a storage device as a hard disc drive (HDD), have been widespread. The recording devices each plays back the recorded broadcast program, so that time-shift viewing of the broadcast program can be made.

A technique described in Japanese Patent Application laid-open No. 2008-289057 (Patent Document 1) records and plays back a broadcast program of a selected channel, and deletes the recorded broadcast program when the broadcasting of the broadcast program finishes. According to the technique described in Patent Document 1, a user who would like to record a broadcast program operates a specifying key during the playback of the broadcast program and, as a result of the operation, the recorded broadcast program is prohibited from being deleted when the broadcasting of the broadcast program finishes. Accordingly, the technique described in Patent Document 1 is capable of recording the broadcast program, which has already started, from its head position.

RELATED ART DOCUMENTS

Patent Documents

Patent Document 1: Japanese Patent Application Laid-open No. 2008-289057

SUMMARY OF THE INVENTION

Problems to be Solved by the Invention

The technique described in Patent Document 1 records the entirety of the currently-viewing broadcast program, and then deletes the unnecessary broadcast program. Thus, the technique described in Patent Document 1 records even the program which the user does not wish to record, so that an unnecessary process is performed.

An object of the present invention is to provide a broadcast reception device capable of a more useful recording process and playback process.

Means for Solving the Problems

Techniques described in CLAIMS are used as means for solving the problem.

To give an example, a broadcast reception device has a program recording execution unit that acquires program identification information for identifying a broadcast program, and program storage-destination information for specifying a server device storing the broadcast program, and stores the acquired program identification information and the acquired program storage-destination information into a recording-content storage area. Also, the broadcast reception device has a reception function execution unit that acquires the program identification information and the program storage-destination information stored in the recording-content storage area, and transmits the program identification information and the program storage-destination information to the server device specified from the acquired program storage-destination information. Further, the broadcast reception device has an output unit that outputs sound information and image information on the broadcast program transmitted from the server device.

Effects of the Invention

The effects obtained by typical embodiments of the invention disclosed in the present application will be briefly described below.

According to one embodiment of the present invention, a broadcast reception device capable of a recording process and a playback process that are more useful can be provided.

BRIEF DESCRIPTIONS OF THE DRAWINGS

FIG. 2A is a block diagram of a broadcast reception device according to the embodiment;

FIG. 2C is a conceptual diagram for describing a data format of a scheduled information table according to the embodiment;

FIG. 2D is a conceptual diagram for describing a data format of a recording-program information table according to the embodiment;

FIG. 5 is an operational sequence diagram of the broadcast reception device according to the embodiment at a time of a recording schedule process;

DETAILED DESCRIPTION OF PREFERRED EMBODIMENTS

Figure 1:
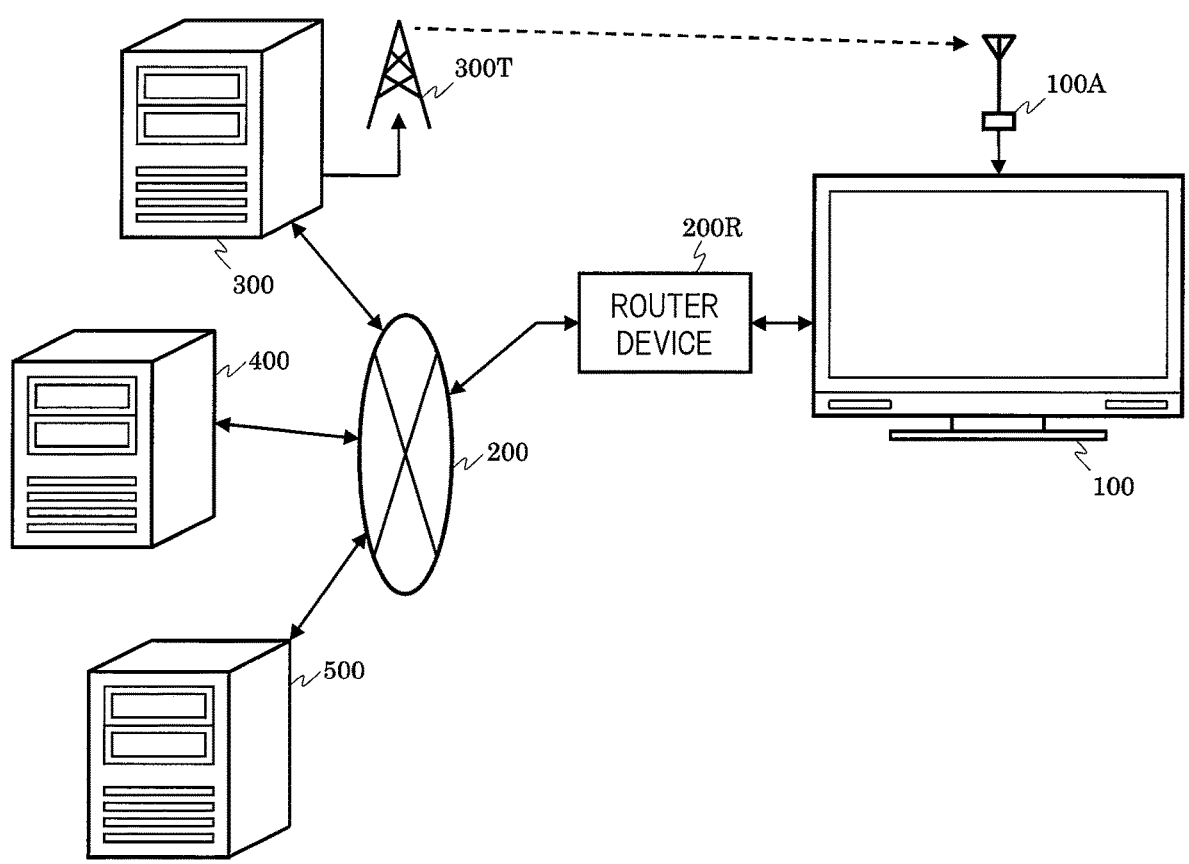
FIG. 1 is a view of a system configuration of a communication system according to an embodiment.

Embodiments of the present invention will be described below using the drawings.

First Embodiment

First, an example of a digital broadcasting service, which can be received by a broadcast reception device according to the present embodiment, will be described.

For example, a plurality of transport streams (TSs) are multiplexed, and can be transmitted to one transponder (frequency channel), as an example of BS/terrestrial digital broadcasting that can be received by the broadcast reception device according to the present embodiment. The TS includes a sequence of TS packets, which have a predetermined length and each of which is obtained by dividing such a data stream as an image/sound elementary stream (ES) or program specific information (PSI)/service information (SI) to add a TS header thereto.

Also, the PSI is a specific information table that is prescribed by a standard of a moving picture experts group (MPEG)-2 system and makes a distinction about which program each ES included in the TS belongs to. The PSI includes a program association table (PAT), a program map table (PMT), and a conditional access table (CAT), etc. The PAT prescribes a program list included in the TS by packet identifiers (PIDs) of the PMT. The PMT prescribes the PIDs of constituent elements in each program. The CAT includes information on conditional reception.

Also, the SI includes program information, etc. by extending the PSI, and contains information on an electronic program guide (EPG) that the Association of Radio Industries and Businesses (ARIB) prescribes by ARIB STD-B10. The SI includes a broadcaster information table (BIT), a service description table (SDT), an event information table (EIT), and a time offset table (TOT), etc. The BIT contains broadcaster-identification information, affiliated information, and broadcaster SI transmission information, etc. The SDT contains: information on a network ID for identifying a network; a TS ID for identifying the TS; a service ID (a so-called channel number) for identifying individual services (so-called channels) in the network, and the like. The EIT contains: a service ID for identifying individual services in the network; and such information on events as a name, broadcast date and time, and a broadcast content of each event (a so-called program). The TOT contains information on current date and time.

Further, the TS contains: program clock reference (PCR) information serving as a reference for playback timing in a decoder; a BML document that is subset based on a broadcast markup language (BML) specification prescribed by ARIB STD-B24; and the like.

The broadcast reception device according to the present embodiment receives and decodes the TS including the image/sound ES, various types of information, and the like, so that a data broadcasting screen etc. produced with broadcast programs, the EPG, and the BML can be provided to a user.

Additionally, the broadcast reception device according to the present embodiment is applicable to a broadcast-communication cooperation system combining a digital broadcasting service with: arithmetic processes in a server device and in acquisition of an additional content through a broadband network by making the digital broadcasting service cooperate with a function of using the broadband network; a presentation process by cooperation with a mobile terminal device; and the like. In order to achieve the broadcast-communication cooperation system, the broadcast reception device according to the present embodiment is capable of performing applications described in a hyper text markup language (HTML) etc. Further, the broadcast-communication cooperation system to which the broadcast reception device is applied uses: an extended BML specification; an application information table (AIT); and extended PSI/SI information necessary for transmitting the application through a broadcast wave in the broadcast-communication cooperation system. Incidentally, the AIT is information for providing and being made to well-know: various types of information necessary for booting the application at a destination etc. from which the application is acquired; and control information for controlling boot/shutdown etc. of the application.

The descriptions that have been given above are based on a digital broadcasting service in Japan, but are not limited to application only in Japan including the broadcast-communication cooperation system to which the broadcast reception device according to the present embodiment is applied.

Next, a concrete example for embodying the present embodiment will be described.

[System Configuration]

FIG. 1 is a view of a system configuration showing an example of a communication system including the broadcast reception device according to the present embodiment. The communication system according to the present embodiment is configured by: a broadcast reception device 100; an antenna 100A; a broadband network 200 such as the Internet; a router device 200R; a radio wave tower 300T on a broadcasting station; a broadcasting station server 300; a service provider server 400; and a different application server 500.

The broadcast reception device 100 is a TV receiver having a function applicable to the broadcast-communication cooperation system in addition to an existing digital-broadcasting reception function. The broadcast reception device 100 receives a broadcast wave transmitted from the radio wave tower 300T through the antenna 100A. Also, the broadcast reception device 100 is capable of connecting with the Internet 200 through the router device 200R, and can transmit and receive data through communication with each server device on the Internet 200. The router device 200R is coupled to the Internet 200 through wired communication, and is coupled to the broadcast reception device 100 through radio communication or wired communication.

The radio wave tower 300T transmits, from a broadcast facility of the broadcasting station, the broadcast wave including: a digital broadcasting signal; an AIT; control information on application presentation; and the like. Incidentally, the control information on the application presentation is information relating to: superimposition of a broadcast program on the TV receiver and an application; and whether the application is presented. Also, the broadcasting station includes the broadcasting station server 300. The broadcasting station server 300 stores broadcast programs (program contents etc.) and metadata such as a program title, a program ID, a program outline, performers, and broadcast date and time for each broadcast program, and can provide a service provider with the program content etc. and each piece of the metadata based on a contract. Incidentally, the provision of the program content etc. and each piece of the metadata to the service provider may be made through an application programming interface (API) included in the broadcasting station server 300.

The service provider server 400 is a server device prepared in order that the service provider provides: a service due to the broadcast-communication cooperation system; a service of content distribution; and the like. The service provider server 400 performs storage, management, and distribution, etc. of: the program content etc. and the metadata provided from the broadcasting station server 300; and contents and applications produced for the broadcast-communication cooperation system. Also, it has functions of searching the applications available in response to an inquiry from the TV receiver, and of providing a list of them. Incidentally, the storage, the management, and the distribution of the program contents and the metadata, and those of the applications may be performed by different server devices. The broadcasting station and the service provider may be identical to or may be different from each other. A plurality of the service provider servers 400 may be prepared for each different service. Further, the broadcasting station server 300 may serve as the function of the service provider server 400.

The different application server 500 is a publicly-known server device performing storage, management, and distribution, etc. of general applications, operation programs, contents, and data that are irrelevant to the broadcast-communication cooperation system. A plurality of the different application servers 500 may exist on the Internet 200.

[Hardware Configuration of Broadcast Reception Device]

FIG. 2A is a block diagram showing an example of an inner configuration of the broadcast reception device 100. The broadcast reception device 100 includes: a main control unit 101; a system bus 102; a ROM 103; a RAM 104; a storage unit 110; a LAN communication unit 121; an extended interface unit 124; a tuner/demodulator 131; a demultiplexer 132; an image decoder 133; a sound decoder 134; a subtitle decoder 135; a data-broadcasting reception processing unit 141; a data-broadcasting engine 142; an application control unit 143; an application engine 144; a content processing unit 151; an image superimposition unit 161; a sound selector 162; an image display unit 163; and a speaker 164.

The main control unit 101 is a microprocessing unit that controls the entire broadcast reception device 100 in accordance with a predetermined operation program. The system bus 102 is a data channel for performing data transmission and reception between the main control unit 101 and each operation block in the broadcast reception device 100.

The read only memory (ROM) 103 is: a memory storing a basic operation program such as an operating system; and a different operation program, and uses a rewritable ROM such as an electrically erasable programmable ROM (EEPROM) or a flash ROM. The random access memory (RAM) 104 becomes a work area in executing the basic operation program and the different operation program. The ROM 103 and the RAM 104 may be configured integrally with the main control unit 101. Further, instead of the independent configuration as illustrated in FIG. 2A, a partial storage area in the storage unit 110 may be used for the ROM 103.

The storage unit 110 stores: the operation programs of the broadcast reception device 100; operation parameters thereof; personal information on a user of the broadcast reception device 100; and the like. Operation programs downloaded from the network, various types of data produced with the operation programs, and the like can be also stored. A content such as a moving image, a still image, or a sound acquired from the broadcast wave or downloaded from the network can be also stored. A partial area of the storage unit 110 may be substituted for the entirety or a part of the function of the ROM 103. Further, the storage unit 110 is required to retain information, which has been stored, even in a state where no power source has been supplied to the broadcast reception device 100 from outside. Therefore, used is a device, for example, such a semiconductor element memory as a flash ROM or a solid state drive (SSD), or such a magnetic disk drive as a hard disc drive (HDD).

Incidentally, each of the operation programs stored in the ROM 103 and the storage unit 110 can be updated and functionally extended by a download process from each server device on the Internet 200.

The local area network (LAN) communication unit 121 is coupled to the Internet 200 through the router device 200R so as to transmit and receive data to and from each server device on the Internet 200. The coupling with the router device 200R may be made through wired communication, or radio communication such as Wi-Fi (registered trademark). The LAN communication unit 121 includes an encode circuit and a decode circuit, etc. Also, the broadcast reception device 100 may further include a different communication unit such as a BlueTooth (registered trademark) communication unit, an NFC communication unit, or an infrared communication unit.

The tuner/demodulator 131 receives the broadcast wave from the radio wave tower 300T through the antenna 100A, and tunes in (selects) a channel of a service desired by the user based on the control of the main control unit 101. Furthermore, the tuner/demodulator 131 demodulates the received broadcast signal so as to acquire the TS. Incidentally, the configuration including one tuner/demodulator is exemplified in FIG. 2A, but the broadcast reception device 100 may be configured so as to mount a plurality of the tuners/demodulators for the purpose of a multiscreen simultaneous display, counter program recording, or the like. Also, control of access restriction may be performed with respect to the demodulated TS based on the control of the main control unit 101.

The TS outputted from the tuner/demodulator 131 is inputted to the demultiplexer 132, and then the demultiplexer 132 demultiplexes the inputted TS into respective data streams such as an image data stream, a sound data stream, a subtitle data stream, a program information data stream, an AIT data stream, and a BML data stream output them. Those data streams may be, for example, in an ES format. The image decoder 133 decodes the image data stream inputted from the demultiplexer 132 so as to output image information. The sound decoder 134 decodes the sound data stream inputted from the demultiplexer 132 so as to output sound information. The subtitle decoder 135 decodes the subtitle data stream inputted from the demultiplexer 132 so as to output subtitle information.

The data-broadcasting reception processing unit 141 decodes the BML data stream inputted from the demultiplexer 132 so as to restore a BML document. The data-broadcasting engine 142 is a BML browser that executes the BML document, and executes the BML document restored by the data-broadcasting reception processing unit 141 so as to output data broadcasting screen information. The application control unit 143 actuates the application engine 144 about applications produced for the broadcast-communication cooperation system to control and manage a life cycle and an event for each application, based on the AIT data stream inputted from the demultiplexer 132 or an AIT file acquired from each server device on the Internet 200. Additionally, functional restriction of the applications is appropriately controlled in accordance with the state of the applications and instructions of the AIT. The application engine 144 is an HTML browser that acquires and performs the applications produced for the broadcast-communication cooperation system based on the control of the application control unit 143.

Based on the control of the main control unit 101, the content processing unit 151 accesses an image content etc. stored in each server device on the Internet 200 through the LAN communication unit 121 so as to acquire a program stream (PS) of the image content. The acquired PS may be further supplied to the demultiplexer 132 so as to be subjected to the same process as that of the TS outputted from the tuner/demodulator 131. The content processing unit 151 may perform control etc. of a digital rights management (DRM) process with respect to the acquired PS based on the control of the main control unit 101. Also, the content processing unit 151 includes a transcoding processing function. That is, it can perform a transcoding process to the PS acquired from each server device on the Internet 200 through the LAN communication unit 121, and then supply the transcoded TS to the demultiplexer 132. Alternatively, it can perform the transcoding process to the TS and an ES outputted from the demultiplexer 132, and store the transcoded TS and ES in the storage unit 110.

The image superimposition unit 161 inputs: the image information outputted from the image decoder 133; the subtitle information outputted from the subtitle decoder 135; the data broadcasting screen information outputted from the data-broadcasting engine 142; and application execution screen information outputted from the application engine 144, and then performs a selection process and/or a superimposition process, etc. The image superimposition unit 161 includes a video RAM not illustrated, and drives the image display unit 163, etc. based on the image information inputted to the video RAM. Also, as the need arises based on the control of the main control unit 101, the image superimposition unit 161 performs: a scaling process; a superimposition process of EPG screen information produced by interpreting the program information data stream outputted from the demultiplexer 132; and the like. The sound selector 162 inputs the sound information outputted from the sound decoder 134, and application execution sound information outputted from the application engine 144, and then appropriately performs a selection process based on the control of the main control unit 101. The image display unit 163 is a display device such as a liquid crystal panel, and provides the user of the broadcast reception device 100 with the image information to which the image superimposition unit 161 has performed the selection process and/or the superimposition process. The speaker 164 provides the user of the broadcast reception device 100 with the sound information outputted from the sound selector 162.

The extended interface unit 124 is an interface group for extending the function of the broadcast reception device 100, and includes an image/sound interface, a universal serial bus (USB) interface, and a memory interface, etc. in the present embodiment. The image/sound interface performs: an input of image data/sound data from an external image/sound output device; an output of image data/sound data to an external image/sound input device; and the like. The USB interface is coupled to a PC etc. so as to transmit and receive various types of data. An HDD may be coupled so as to record broadcast programs or various types of content instead of the storage unit 110. Further, a keyboard or a different USB device may be coupled. The memory interface couples a memory card or a different memory medium so as to transmit and receive data.

The broadcast reception device 100 may be: an optical disc drive recorder such as a digital versatile disc (DVD); a magnetic disk drive recorder such as a HDD recorder; a set top box (STB); and the like besides the TV receiver. It may be a personal computer (PC), a tablet terminal, a video game console, or the like having a digital-broadcasting reception function and a broadcast-communication cooperation function. Incidentally, the broadcast-communication cooperation function may be unnecessary. When the broadcast reception device 100 is the DVD recorder, the HDD recorder, the STB, or the like, an image output unit and a sound output unit may be provided instead of the image display unit 163 and the speaker 164. By connecting an external monitor and an external speaker to the image output unit and the sound output unit, the same operation as that of the broadcast reception device 100 according to the present embodiment can be made.

[Software Configuration of Broadcast Reception Device]

Figure 2B:
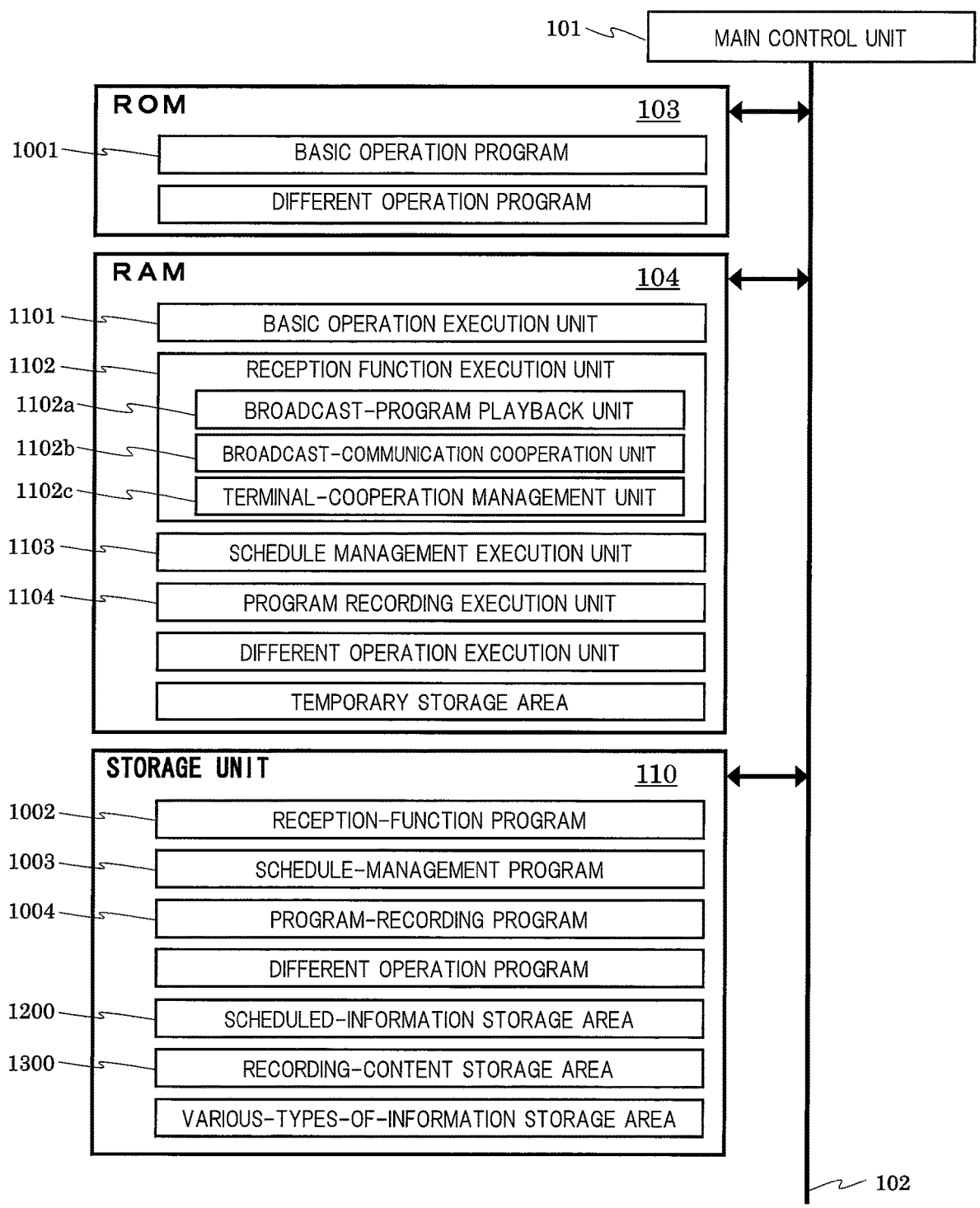
FIG. 2B is a diagram of a software configuration of the broadcast reception device according to the embodiment.

FIG. 2B is a diagram of a software configuration of the broadcast reception device 100 according to the present embodiment, and illustrates software configurations of the ROM 103, the RAM 104, and the storage unit 110. According to the present embodiment, the ROM 103 stores the basic operation program 1001 and the different operation program. The storage unit 110 stores a reception-function program 1002, a schedule-management program 1003, a program-recording program 1004, and a different operation program. Also, the storage unit 110 includes: a scheduled-information storage area 1200 that stores information etc. on a recording schedule and a viewing schedule of a broadcast program; a recording-content storage area 1300 that stores information etc. on an already recorded program; and a various-types-of-information storage area that stores different various types of information.

The basic operation program 1001 stored in the ROM 103 is expanded into the RAM 104, and furthermore the main control unit 101 executes the expanded basic operation program to configure a basic operation execution unit 1101. Also, the reception-function program 1002, the schedule-management program 1003, and the program-recording program 1004 stored in the storage unit 110 are each expanded into the RAM 104, and furthermore the main control unit 101 executes the respective expanded operation programs to configure a reception function execution unit 1102, a schedule management execution unit 1103, and a program recording execution unit 1104. Additionally, the RAM 104 includes a temporary storage area that retains, temporarily as the need arises, data produced in executing the respective operation programs.

Incidentally, in order to simplify explanation below, the main control unit 101 expands, into the RAM 104, the basic operation program 1001 stored in the ROM 103 and executes it, and thereby a process of controlling each operation block is described so that the basic operation execution unit 1101 controls the respective operation blocks. The different operation program is also similarly described.

The reception function execution unit 1102 controls the respective operation blocks of the broadcast reception device 100 in order to achieve the digital-broadcasting reception function and the broadcast-communication cooperation function, etc. Particularly, a broadcast-program playback unit 1102a mainly controls the tuner/demodulator 131, the demultiplexer 132, the image decoder 133, the sound decoder 134, the subtitle decoder 135, the data-broadcasting reception processing unit 141, and the data-broadcasting engine 142. A broadcast-communication cooperation unit 1102b mainly controls the application control unit 143 and the application engine 144. A terminal-cooperation management unit 1102c controls cooperation with a portable information terminal during a broadcast-communication cooperation process.

The schedule management execution unit 1103 manages the information etc. on the recording schedule and the viewing schedule of the broadcast program using a scheduled information table stored in the scheduled-information storage area 1200. The program recording execution unit 1104 controls an operation of scheduled recording based on the scheduled information table stored in the scheduled-information storage area 1200, and an operation of manual recording with the currently-viewing broadcast program. Also, the information etc. on the already recorded program is managed using a recording-program information table stored in the recording-content storage area 1300.

The ROM 103 and/or the storage unit 110 may previously store the respective operation programs when a product is shipped. After the product is shipped, the respective operation programs may be acquired from the different application server 500 etc. on the Internet 200 through the LAN communication unit 121. Further, the respective operation programs stored in a memory card, an optical disc, or the like may be acquired through the extended interface unit 124.

FIG. 2C is a conceptual diagram for describing an example of a data format of the scheduled information table stored in the scheduled-information storage area 1200. The scheduled information table includes information such as a reference number 1201, broadcast-date information 1202, broadcast-time information 1203, broadcast-channel information 1204, broadcast-program-title information 1205, a repetition flag 1206, a recording/viewing mode 1207, and recording-destination information 1208. Different information may be further included.

The reference number 1201 is used for managing respective pieces of scheduled information stored in the scheduled information table. The broadcast-date information 1202, the broadcast-time information 1203, the broadcast-channel information 1204, and the broadcast-program-title information 1205 are information relating to the date and time, the channel and the program title of the scheduled-targeted broadcast program. The repetition flag 1206 is a flag indicating whether a recording process or a viewing process of the scheduled-targeted broadcast program is repeated every week or every day. The recording/viewing mode 1207 is mode setting information on whether a process performed based on each piece of scheduled information is a scheduled recording process or a scheduled viewing process and on what a recording mode is used for performing the scheduled recording process when the scheduled recording process is performed. The recording-destination information 1208 is information on what storage (e.g., the storage unit 110 or a USB HDD coupled to an extended I/F) is used to record information on the recorded-targeted broadcast program when the scheduled recording process is performed.

FIG. 2D is a conceptual diagram for describing an example of a data format of the recording-program information table stored in the recording-content storage area 1300. The recording-program information table includes a reference number 1301, recording-date information 1302, recording-time information 1303, recording-channel information 1304, recording-program-title information 1305, a recording mode 1306, recording-program identification information 1307, recording-program-content storage-destination information 1308, and resume information 1309. Different information may be further included.

The reference number 1301 is used for managing the respective pieces of recording-program information stored in the recording-program information table. The recording-date information 1302 and the recording-time information 1303 are information relating to the date and time when a recording process of the already recorded program is performed, according to the present embodiment. The recording-channel information 1304 and the recording-program-title information 1305 is information relating to a broadcast channel and a program title of the already recorded program. The recording mode 1306 is mode setting information indicating what a recording mode has been used for performing the recording process for each already recorded program. The recording-program identification information 1307 is a unique identification number for identifying a content of the already recorded program by a content server on the network. The recording-program-content storage-destination information 1308 is information indicating a storage destination of the content of the already recorded program. The recording-program-content storage-destination information 1308 may be such identification information as an Internet protocol (IP) address for identifying, on the network, the content server storing the content of the already recorded program. Directory information and a file name may be added in order to prescribe a location at which the content of the already recorded program has been stored in the content server. When the content of the already recorded program is stored in a storage of the broadcast reception device 100, identification information that can identify the storage may be contained. The resume information 1309 is information relating to a stopping position where a playback process of the content of the already recorded program is temporarily stopped.

[Configuration of Broadcasting Station Server]

Figure 3:
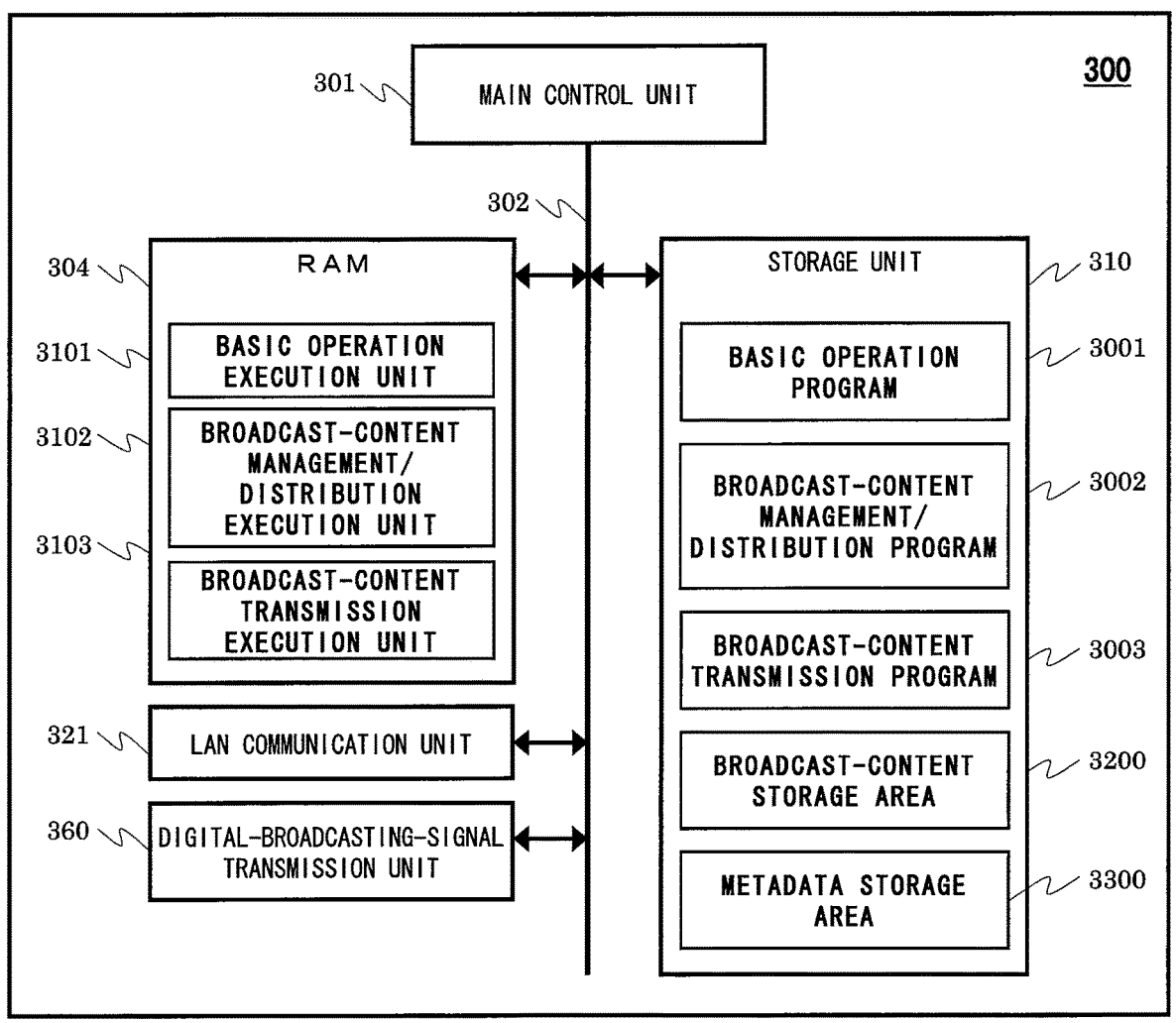
FIG. 3 is a block diagram of a broadcasting station server according to the embodiment.

FIG. 3 is a block diagram showing an example of an internal configuration of the broadcasting station server 300. The broadcasting station server 300 includes a main control unit 301, a system bus 302, a RAM 304, a storage unit 310, a LAN communication unit 321, and a digital-broadcasting-signal transmission unit 360.

The main control unit 301 is a microprocessing unit that controls the entire broadcasting station server 300 in accordance with a predetermined operation program. The system bus 302 is a data channel for performing data transmission and reception between the main control unit 301 and each operation block in the broadcasting station server 300. The RAM 304 becomes a work area in performing each operation program.

The storage unit 310 stores a basic operation program 3001, a broadcast-content management/distribution program 3002, and a broadcast-content transmission program 3003, and further includes a broadcast-content storage area 3200 and a metadata storage area 3300. The broadcast-content storage area 3200 stores a program content etc. of each broadcast program broadcasted by the broadcasting station. The metadata storage area 3300 stores metadata such as a program title, a program ID, a program outline, performers, and broadcast date and time for each of the broadcast programs.

Also, the basic operation program 3001, the broadcast-content management/distribution program 3002, and the broadcast-content-transmission program 3003 stored in the storage unit 310 are each expanded into the RAM 304, and furthermore the main control unit 301 executes the respective expanded programs, so that a basic operation execution unit 3101, a broadcast-content management/distribution execution unit 3102, and a broadcast-content transmission execution unit 3103 are configured.

Incidentally, in order to simplify explanation below, the main control unit 301 expands, into the RAM 304, the basic operation program 3001 stored in the storage unit 310 and executes it, and thereby a process for controlling each operation block is described so that the basic operation execution unit 3101 controls the respective operation blocks. The different operation programs are also similarly described.

The broadcast-content management/distribution execution unit 3102 performs management of the program content etc. and respective pieces of the metadata for each of the broadcast programs stored in the broadcast-content storage area 3200 and the metadata storage area 3300, and also performs control in providing the service provider with the program content etc. and the respective pieces of the metadata for each of the broadcast programs based on the contract. Furthermore, the broadcast-content management/distribution execution unit 3102 may performs an authentication process etc. of the service provider server 400, based on the contract as the need arises, when the program content etc. and the respective pieces of the metadata for each of the broadcast programs are provided to the service provider.

The broadcast-content transmission execution unit 3103 performs time schedule management in transmitting the program content of each of the broadcast programs stored in the broadcast-content storage area 3200 from the radio wave tower 300T through the digital-broadcasting-signal transmission unit 360.

The LAN communication unit 321 is coupled to the Internet 200, and communicates with the service provider server 400 etc. on the Internet 200. The LAN communication unit 321 includes an encode circuit and a decode circuit, etc. The digital-broadcasting-signal transmission unit 360: modulates the TS configured by the image data stream, the sound data stream, the program information data stream, and the AIT data stream, etc. that relate to the program contents etc. for each of the broadcast programs stored in the broadcast-content storage area 3200; and transmits the TS as a digital broadcast wave through the radio wave tower 300T.

[Configuration of Service Provider Server]

Figures 4A, 4B:
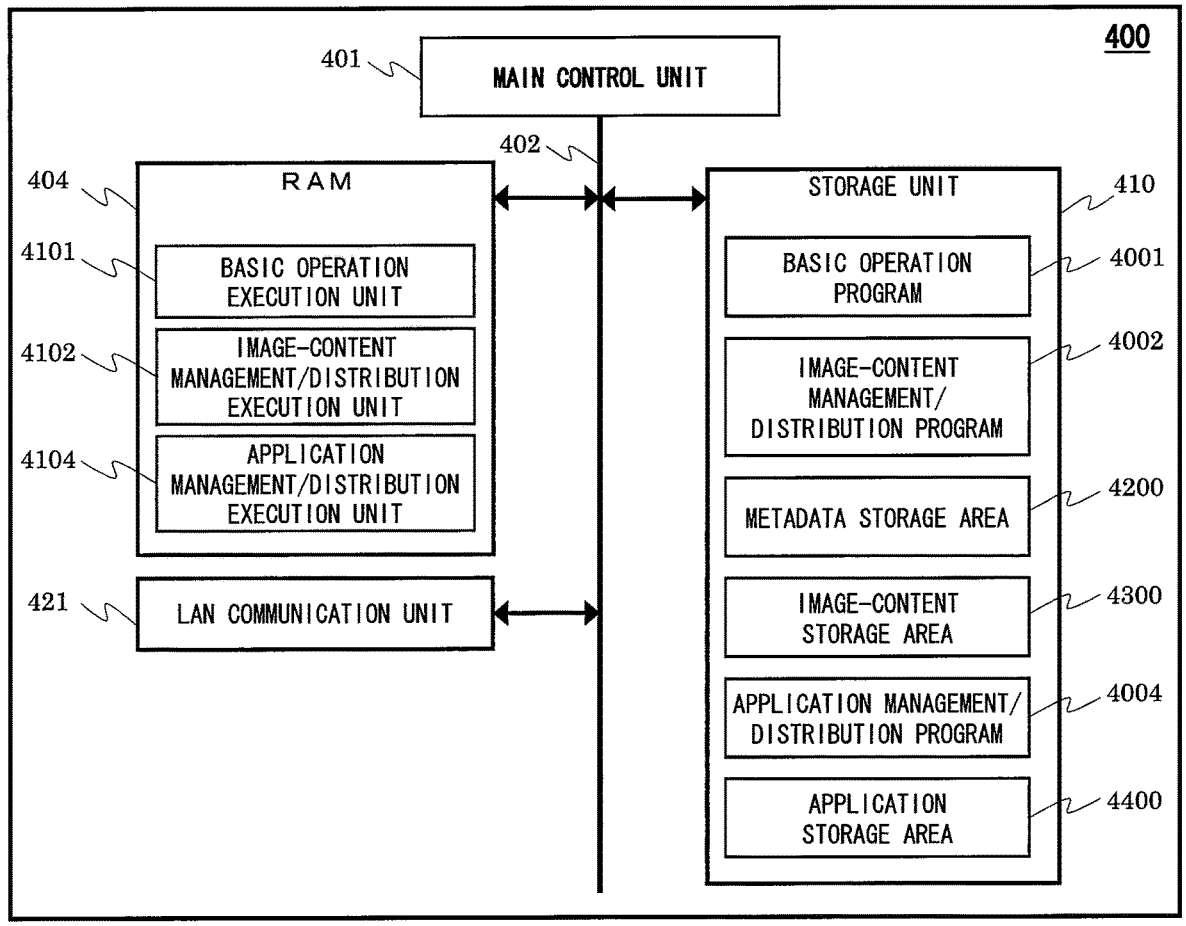
FIG. 4A is a block diagram of a service provider server according to the embodiment.
FIG. 4B is a conceptual diagram for describing a data format of a content information table according to the embodiment.

FIG. 4A is a block diagram showing an example of an internal configuration of the service provider server 400. The service provider server 400 includes a main control unit 401, a system bus 402, a RAM 404, a storage unit 410, and a LAN communication unit 421.

The main control unit 401 is a microprocessing unit that controls the entire service provider server 400 in accordance with a predetermined operation program. The system bus 402 is a data channel for performing data transmission and reception between the main control unit 401 and each operation block in the service provider server 400. The RAM 404 becomes a work area in executing each operation program.

The storage unit 410 stores a basic operation program 4001, an image-content management/distribution program 4002, and an application management/distribution program 4004, and furthermore includes a metadata storage area 4200, an image-content storage area 4300, and an application storage area 4400. The metadata storage area 4200 stores: each piece of metadata provided from the broadcasting station server 300; metadata relating to an image content produced by the service provider; and the like. The image-content storage area 4300 stores, as the image content, the program content of the broadcast program provided from the broadcasting station server 300. The image content etc. produced by the service provider is also stored. The application storage area 4400 stores applications that are distributed in response to a request from each TV receiver, and is necessary for achieving each service of the broadcast-communication cooperation system.

Further, the basic operation program 4001, the image-content management/distribution program 4002, and the application management/distribution program 4004 each stored in the storage unit 410 are expanded into the RAM 404, and furthermore the main control unit 401 executes the expanded basic operation program, the expanded image-content management/distribution program, and the expanded application management/distribution program, so that a basic operation execution unit 4101, an image-content management/distribution execution unit 4102, and an application management/distribution execution unit 4104 are configured.

Incidentally, in order to simplify explanation below, the main control unit 401 expands, into the RAM 404, the basic operation program 4001 stored in the storage unit 410 and executes it, and thereby a process for controlling each operation block is described so that the basic operation execution unit 4101 controls the respective operation blocks. The different operation program is also similarly described.

The image-content management/distribution execution unit 4102 controls: acquisition of the program content etc. and the metadata of the broadcast program from the broadcasting station server 300; management of the image content etc. and the metadata stored in the image-content storage area 4300 and the metadata storage area 4200; and distribution of the image content etc. and the metadata to each TV receiver. Also, the application management/distribution execution unit 4104 performs: management of the respective applications stored in the application storage area 4400; and control in distributing the respective applications in response to requests from the respective TV receivers. Furthermore, the application management/distribution execution unit 4104 may perform, as the need arises, an authentication process etc. to the respective TV receivers in distributing the respective applications to the respective TV receivers.

The LAN communication unit 421 is coupled to the Internet 200, and communicates with the broadcasting station server 300 on the Internet 200 and with the broadcast reception device 100 through the router device 200R. The LAN communication unit 421 includes an encode circuit and a decode circuit.

FIG. 4B is a conceptual diagram for describing an example of a data format of a content information table stored in the metadata storage area 4200. The content information table includes information such as program identification information 4201, content storage location information 4202, a content name 4203, content title information 4204, content category information 4205, content broadcast-date information 4206, content broadcast-time information 4207, and content outline information 4208, etc. Different information may be further included.

The program identification information 4201 is a unique identification number for identifying each image content in the service provider server 400. The content storage location information 4202 is directory information for prescribing storage locations of the respective image contents in the image-content storage area 4300. When the content storage location information 4202 indicates "NULL", this means a state where the corresponding image content has not been stored in the image-content storage area 4300 or a state where the corresponding image content is not a distributed object even when being stored in the image-content storage area 4300. The content name 4203 is a file name of each image content. The content title information 4204, the content category information 4205, the content broadcast-date information 4206, the content broadcast-time information 4207, and the content outline information 4208 are information relating to a title, a category, broadcast date and time, and a program outline of each image content.

An operation of the broadcast reception device 100 according to the present embodiment will be described below.

[Operational Sequence in Recording Schedule]

First, a description will be made of an operation of a recording schedule process of a broadcast program using an EPG in the broadcast reception device 100 according to the present embodiment. FIG. 5 is an operational sequence diagram for describing an example of the operation of the recording schedule process in the broadcast reception device 100 according to the present embodiment.

When the broadcast reception device 100 according to the present embodiment performs the recording schedule process, the user first operates a remote controller not illustrated so as to issue an instruction for turning power on to the broadcast reception device 100 (S501). The broadcast reception device 100, which has received the instruction for turning the power on from the remote controller, controls the basic operation execution unit 1101, and thereby performs a boot process and an initialization process (S502). Incidentally, the processes at S501 and S502 are unnecessary in a case where the broadcast reception device 100 has already booted. When the boot process and the initialization process are completed, the broadcast-program playback unit 1102*a* in the reception function execution unit 1102 then receives a digital broadcast wave so as to perform a process of tuning in (selecting) a predetermined channel, a process of demodulating a modulated signal, and the like by the tuner/demodulator 131 (S503). Furthermore, the broad reception device performs: a demultiplexing process to the respective data streams in the demultiplexer 132; decode processes to the image data stream and the sound data stream in the image decoder 133 and the sound decoder 134; and the like, and outputs an image signal and a sound signal of the broadcast program through the image superimposition unit 161 and the sound selector 162 from the image display unit 163 and the speaker 164 (S504).

Also, the broadcast-program playback unit 1102*a* acquires the program information data stream demultiplexed by the demultiplexer 132 (S505). When the user operates the remote controller so as to issue an instruction for displaying the EPG (S506), the broadcast-program playback unit 1102*a* interprets the acquired program information data stream to creates EPG information, and further displays an EPG display screen on the image display unit 163 (S507).

Figure 6:
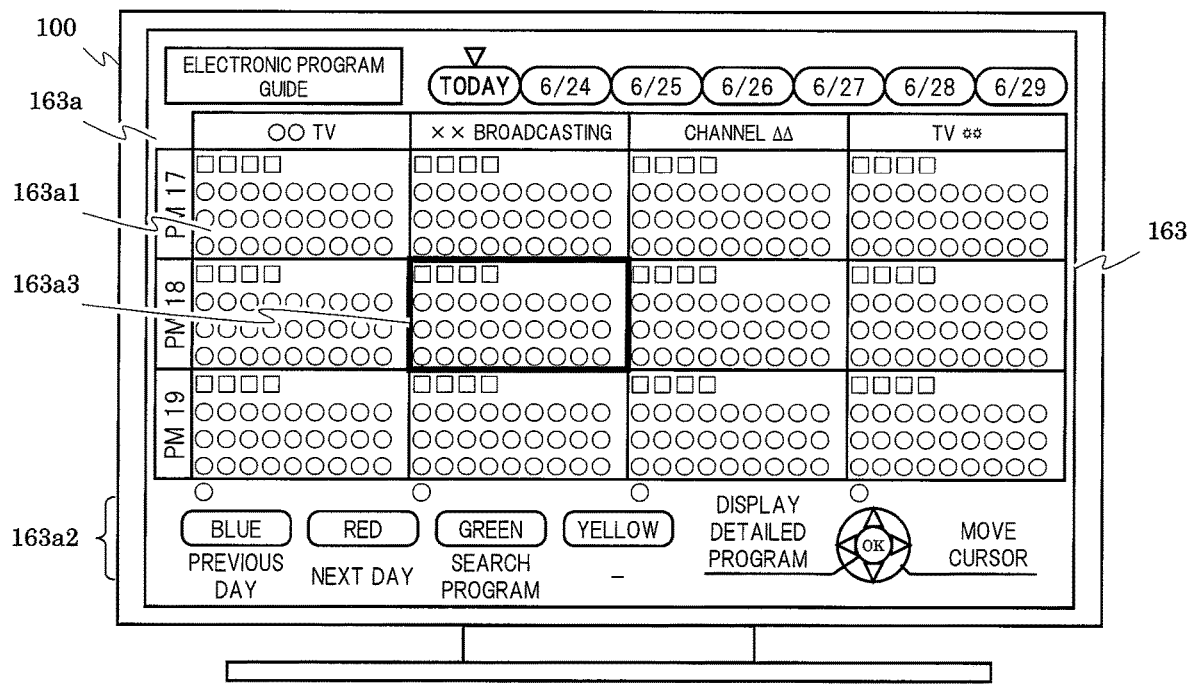
FIG. 6 is a view of a screen display of an electronic program guide display screen on the broadcast reception device according to the embodiment.

FIG. 6 is a view of a screen display for describing an example of the EPG display screen displayed by the process at S507. The EPG display screen 163*a* is a broadcast schedule of broadcast programs in the digital broadcasting service, and displays, in the present embodiment, program information 163*a*1 on each broadcast program broadcasted by respective channels in each time period, and the display is in a matrix format indicating a time display as a vertical axis and a service ID (channel) display as a horizontal axis. An operation guide 163*a*2 is displayed at a lower portion of the EPG display screen 163*a*. By operating a cursor key of the remote controller not illustrated, a program selection cursor 163*a*3 can be moved. Furthermore, by pressing down an OK key of the remote controller, the detailed information on the broadcast program selected by the program selection cursor 163*a*3 can be displayed.

When the user operates the cursor key and the OK key of the remote controller so as to select the predetermined broadcast program on the EPG display screen 163*a* displayed by the process at S507 in FIG. 5 (S508), the schedule management execution unit 1103 displays a program-detailed-information display screen relating to the selected predetermined broadcast program on the image display unit 163 based on the control of the reception function execution unit 1102 (S509).

Figure 7:
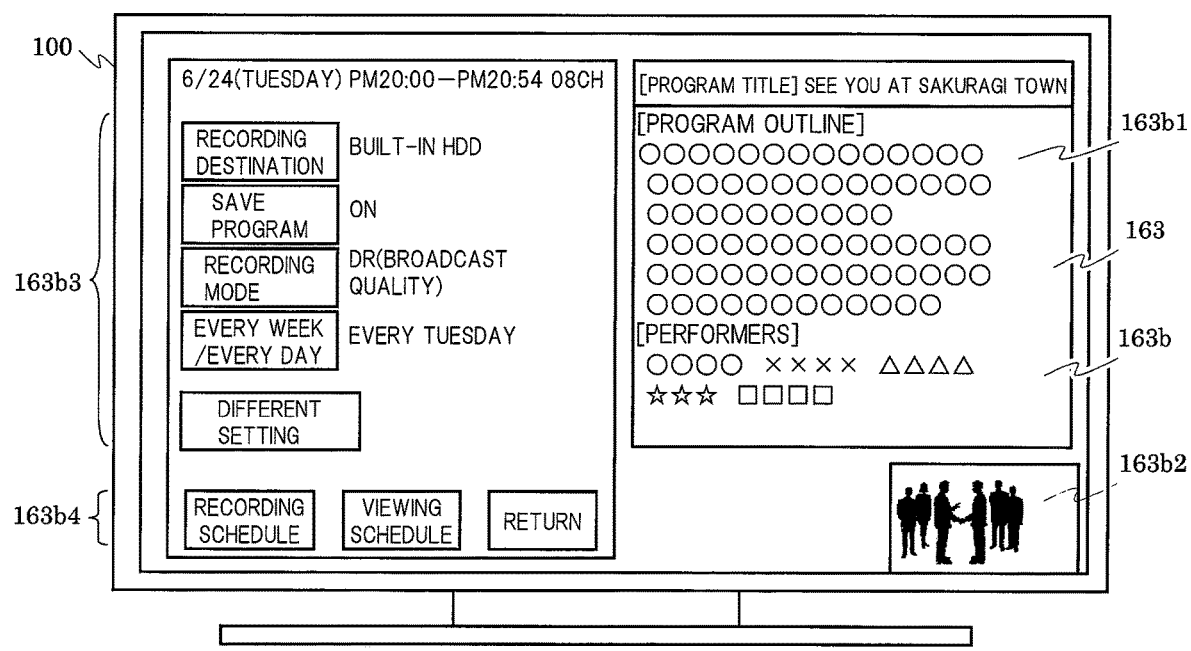
FIG. 7 is a view of a screen display of a program-detailed-information display screen on the broadcast reception device according to the embodiment.

FIG. 7 is a view of a screen display for describing an example of the program-detailed-information display screen displayed by the process at S509. The program-detailed-information display screen 163*b* includes: a program-information display area 163*b*1 that displays information on a program title, a program outline, and performers of the selected predetermined broadcast program; a sub-window area 163*b*2 that displays an image of a currently-viewing broadcast program; a schedule setting key 163*b*3 capable of making various settings relating to the recording schedule process and the viewing schedule process; and operation selection keys 163*b*4 capable of selecting which of the recording schedule process, the viewing schedule process, or the like is performed to the selected predetermined broadcast program.

When a "recording destination" key of the schedule setting key 163*b*3 is selected by operating the cursor keys and the OK key of the remote controller not illustrated, a storage that stores information on the recorded-targeted broadcast program can be selected. When a "save program" key is selected, setting of whether the content of the recorded-targeted broadcast program is saved into the storage in the broadcast reception device 100 can be made. When a "recording mode" key is selected, setting of which type of recording mode is used to record the recorded-targeted broadcast program can be made. When an "every week/every day" key is selected, setting of whether the scheduled recording process or the scheduled viewing process of the targeted broadcast program is repeated every week, every day, or the like can be made. Also, when any of the operation selection keys 163b4 is selected by operating the cursor key and the OK key of the remote controller, the schedule of the recording process or the viewing process can be performed to the selected predetermined broadcast program.

When the user operates the cursor key and the OK key of the remote controller so as to select the "recording schedule" key of the operation selection keys 163b4 on the program-detailed-information display screen 163b displayed by the process at S509 in FIG. 5 (S510), the schedule management execution unit 1103 stores information etc. on a setting content of each item, which is set through the program-detailed-information display screen 163b, into the scheduled-information table in the scheduled-information storage area 1200 (S511). Specifically, for example, setting information corresponding to the setting content of each of the "recording destination" key and the "save program" key in the schedule setting key 163b3 is stored into the recording-destination information 1208 of the scheduled information table. The recording/viewing mode 1207 stores the content set by the "recording mode" key. The repetition flag 1206 stores the content set by the "every week/every day" key.

When the process at S511 is completed, the display of the program-detailed-information display screen 163b is completed so that the broadcast-program playback unit 1102a displays the image of the currently-viewing broadcast program on the image display unit 163 (S512). The recording schedule process in the broadcast reception device 100 is completed through the above operation.

[Operational Sequence in Scheduled Recording]

Figure 8:
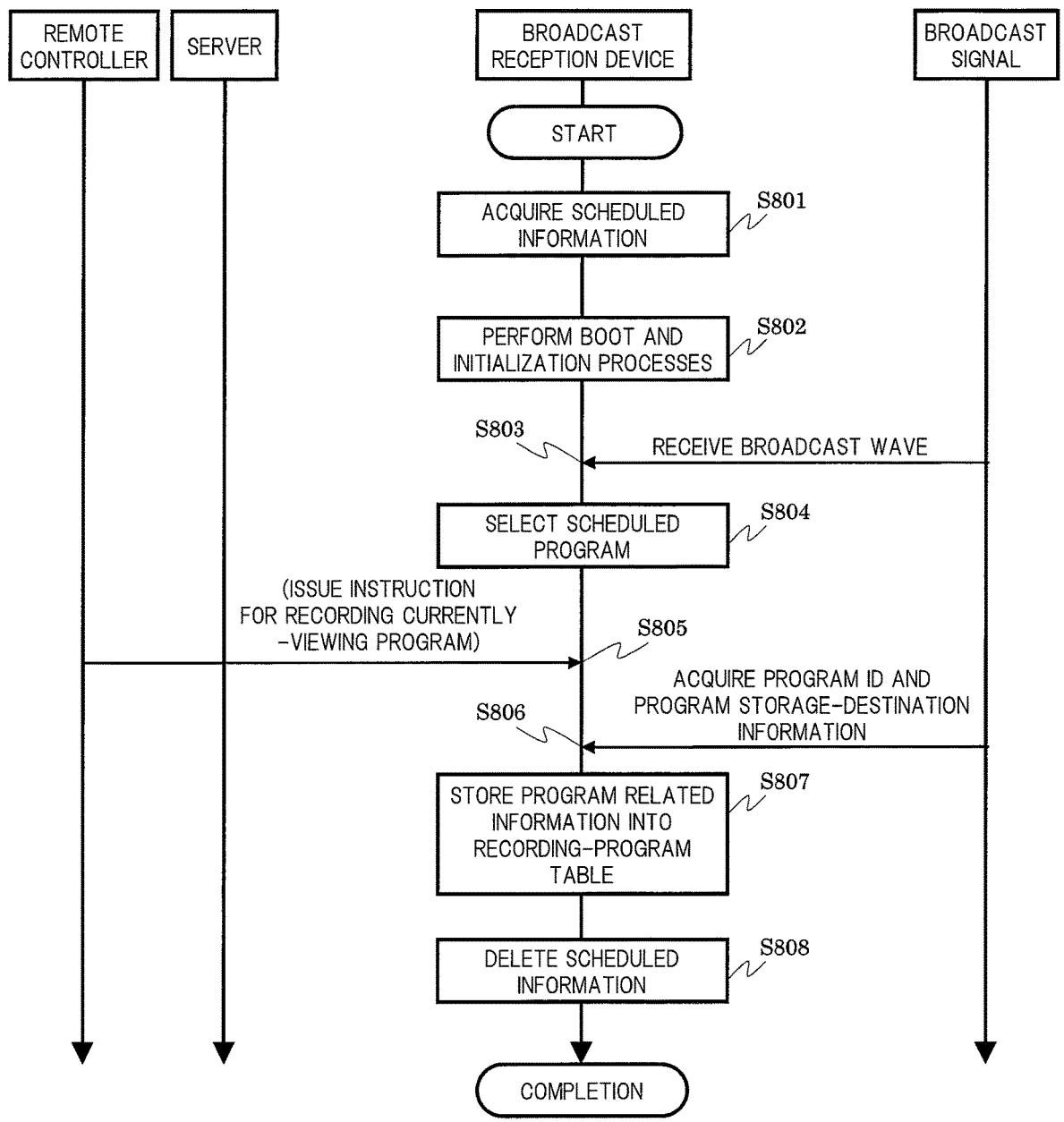
FIG. 8 is an operational sequence diagram of the broadcast reception device according to the embodiment at a time of a scheduled recording process.

Next, a description will be made of an operation of the scheduled recording process based on the scheduled information table stored in the scheduled-information storage area 1200 in the broadcast reception device 100 according to the present embodiment. FIG. 8 is an operational sequence diagram for explaining an example of an operation of the scheduled recording process in the broadcast reception device 100 according to the present embodiment.

When the broadcast reception device 100 is in operation or on standby, the program recording execution unit 1104 appropriately confirms time information of a built-in clock not illustrated, and the scheduled information table in scheduled-information storage area 1200 based on the control of the basic operation execution unit 1101 (S801). When the broadcast program that is a scheduled-recorded target and is stored in the scheduled information table approaches at its broadcast starting date and time, the basic operation execution unit 1101 performs the boot process and the initialization process in the broadcast reception device 100 (S802). Incidentally, the process at S802 is unnecessary in a case where the broadcast reception device 100 has already been in operation. When the boot process and the initialization process are completed, the broadcast-program playback unit 1102a in the reception function execution unit 1102 next receives the digital broadcast wave (S803), and furthermore the tuner/demodulator 131 performs: a tuning-in (selecting) process to a channel of the broadcast program as a scheduled-recorded target; a demodulating process of a modulated signal, and the like (S804). Incidentally, the process at S804 may be performed by appropriately selecting an available tuner in cases where the broadcast reception device 100 has already been in operation and where an arbitrary broadcast program that is not a scheduled-recorded target has been being selected. Further, the image of the broadcast program as a scheduled-recorded target is not necessarily displayed on the image display unit 163.

When the tuning-in process to the channel of the broadcast program as a scheduled-recorded target is completed, the program recording execution unit 1104 acquires program related information containing program identification information and program-content storage-destination information on the broadcast program that is a scheduled-recorded target and that is superimposed on the digital broadcast wave based on the control of the reception function execution unit 1102 (S806). Incidentally, the program identification information and the program-content storage-destination information may be included in the PSI or the SI. They may be included in the AIT used in the broadcast-communication cooperation function. They may be included in the BML data stream used in data broadcasting. They may be included in the digital broadcast wave together with a program content of a broadcast program signal so as to be transmitted by a different method. Alternatively, they may be acquired by accessing a predetermined server device specified by the AIT in the broadcast-communication cooperation function.

By the control of the program recording execution unit 1104, the program related information containing the program identification information and the program-content storage-destination information on the broadcast program that is the scheduled-recorded target and that is acquired by the process at S806 is stored into the recording-program information table in the recording-content storage area 1300 together with the information described in the scheduled-program information table in the scheduled-information storage area 1200 referenced by the process at S801 (S807). Concretely, for example, the recording-program identification information 1307 in the recording-program information table stores the acquired program identification information. The recording-program-content storage-destination information 1308 stores the acquired program-content storage-destination information. Also, the broadcast-date information 1202, the broadcast-time information 1203, the broadcast-channel information 1204, the broadcast-program-title information 1205, and the recording/viewing mode 1207 of the scheduled information table in the scheduled-information storage area 1200 are stored into the recording-date information 1302, the recording-time information 1303, the recording-channel information 1304, the recording-program-title information 1305, and the recording mode 1306 of the recording-program information table.

When the process at S807 is completed, the schedule management execution unit 1103 deletes the scheduled information stored in the scheduled information table in the scheduled-information storage area 1200 (S808). The scheduled recording process in the broadcast reception device 100 is completed by the above operation.

Incidentally, the above series of processes is an example of the process for a case where the "save program" key is set to select "OFF" in the schedule setting key 163b3 on the program-detailed-information display screen 163b, namely, is an example of a case where the program content about the broadcast program as a scheduled-recorded target is not stored in the storage of the broadcast reception device 100. When the "save program" key is set to select "ON", the broadcast reception device 100 according to the present embodiment in the process at S807 may directly store the program content (TS or ES) outputted from the demultiplexer 132 as it is, or may store the above program content into a storage (e.g., the recording-content storage area 1300 of the storage unit 110, or an HDD coupled to the extended I/F unit 124) designated by the "recording destination" key in the schedule setting key 163b3 after the content processing unit 151 performs a transcoding process to the program content depending on the setting content of the "recording mode" key in the schedule setting key 163*b*3.

Additionally, as described above, the selection of whether the program content of the broadcast program as a scheduled-recorded target is not stored in the storage of the broadcast reception device 100 may be changed depending on the setting of the "save program" key in the schedule setting key 163*b*3 on the program-detailed-information display screen 163*b*. Alternatively, the selection may be automatically changed depending on whether the program related information containing the program identification information and the program-content storage-destination information on the broadcast program as a scheduled-recorded target has been superimposed on the digital broadcast wave. That is, for example, the program content of the broadcast program as a scheduled-recorded target is made not to be stored in the storage of the broadcast reception device 100 in the case where the program related information containing the program identification information and the program-content storage-destination information on the broadcast program as a scheduled-recorded target has been superimposed on the digital broadcast wave. The program content of the broadcast program as a scheduled-recorded target is made to be stored in the storage of the broadcast reception device 100 in the case where the program related information containing the program identification information and the program-content storage-destination information on the broadcast program as a scheduled-recorded target has not been superimposed on the digital broadcast wave.

Also, in this case, whether the program related information containing the program identification information and the program-content storage-destination information on each broadcast program has been superimposed on the digital broadcast wave may be at least visually confirmed in the program information 163*a*1 on the EPG display screen 163*a*. For example, the program information 163*a*1 on the broadcast program, in which the program related information containing the program identification information and the program-content storage-destination information has been superimposed on the digital broadcast wave, uses addition of a letter, a symbol, or an illustration, a distinction between background colors, or the like to clarify the superimposition.

Additionally, at S803, the broadcast-program playback unit 1102*a* may receive the broadcast wave only during a predetermined period (e.g., for one minute after a program starts). Moreover, when the program identification information 1307 and the program storage-destination information 1308 on the broadcast program as a scheduled-recorded target are transmitted every predetermined interval (e.g., 15 seconds), the broadcast-program playback unit 1102*a* may receive the digital broadcasting only at the interval (e.g., 15 seconds) at S803. Accordingly, the tuner can be promptly available.

Furthermore, in a case where scheduled information on a plurality of broadcast programs each overlapping at the broadcast time 1203 has been stored in the scheduled information table, the broadcast-program playback unit 1102*a* may circuitously receive the broadcast wave of each of the broadcast programs at S803.

Also, when a manual operation performs a recording process in viewing the broadcast program instead of the scheduled recording process based on the scheduled-information table stored in the scheduled-information storage area 1200, the above processes at S801 and S808 are unnecessary. In viewing the broadcast program selected by the process at S804, the user operates the remote controller not illustrated to issue an instruction for manual recording (S805), and thereby the below processes at S806 and S807 may be performed.

[Operational Sequence in Recording-Program Playback]

Figure 9:
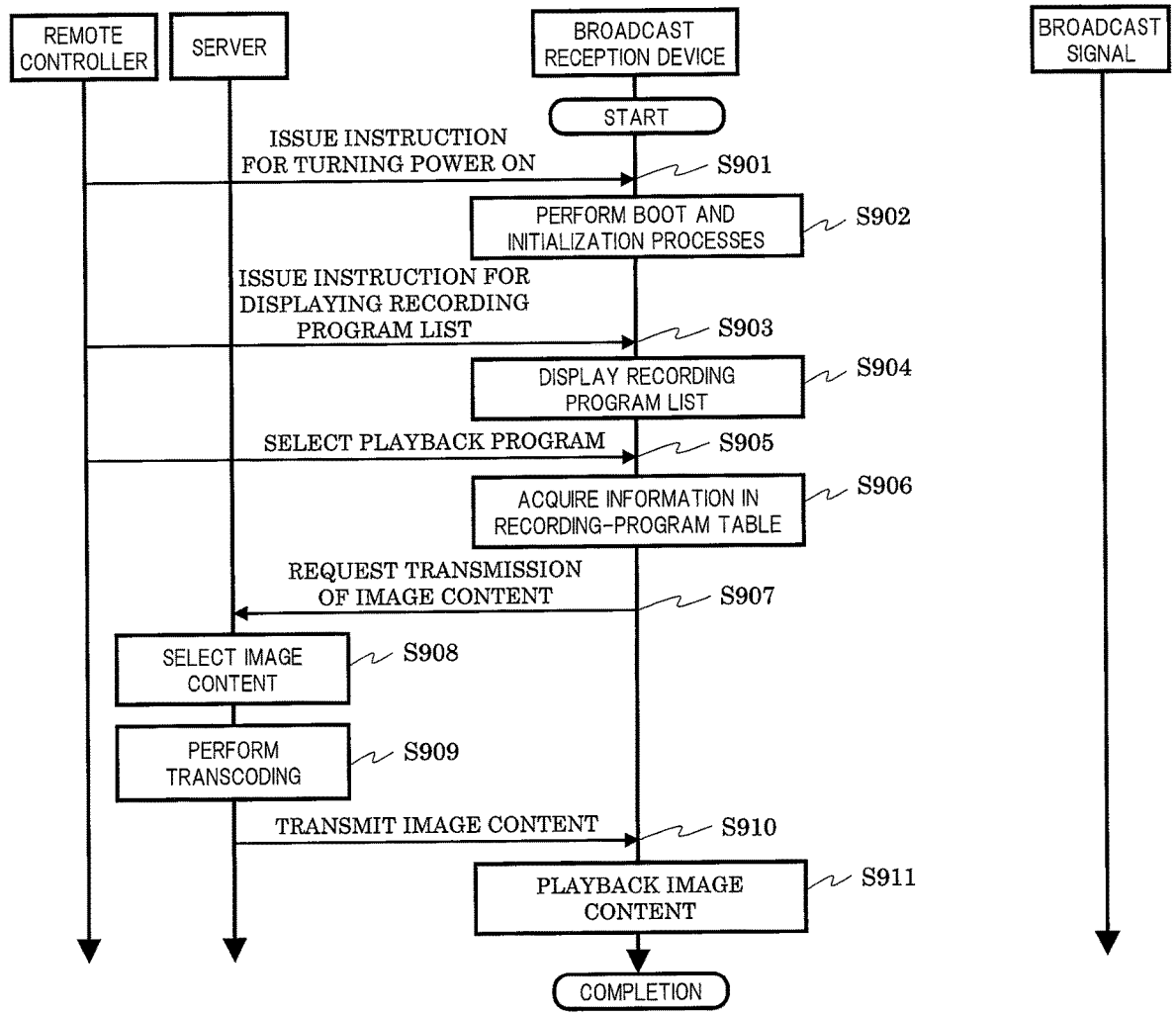
FIG. 9 is an operational sequence diagram of the broadcast reception device according to the embodiment at a time of a recording-program playback process.

Next, a description will be made of an operation of a playback process of the already recorded program based on the recording-program information table stored in the recording-content storage area 1300 in the broadcast reception device 100 according to the present embodiment. FIG. 9 is an operational sequence diagram for describing an example of an operation of the recording-program playback process in the broadcast reception device 100 according to the present embodiment.

When the broadcast reception device 100 according to the present embodiment performs the recording-program playback process, the user first operates the remote controller not illustrated so as to issue an instruction for turning power on to the broadcast reception device 100 (S901). The broadcast reception device 100 that has received, from the remote controller, the instruction for turning the power on controls the basic operation execution unit 1101 so as to perform the boot process and the initialization process (S902). Incidentally, the processes at S901 and S902 are unnecessary in a case where the broadcast reception device 100 has already booted. After the boot process and the initialization process, when the user operates the remote controller so as to issue an instruction for displaying a recording-program list (S903), the reception function execution unit 1102 displays a recording-program list display screen on the image display unit 163 (S904).

Figure 10:
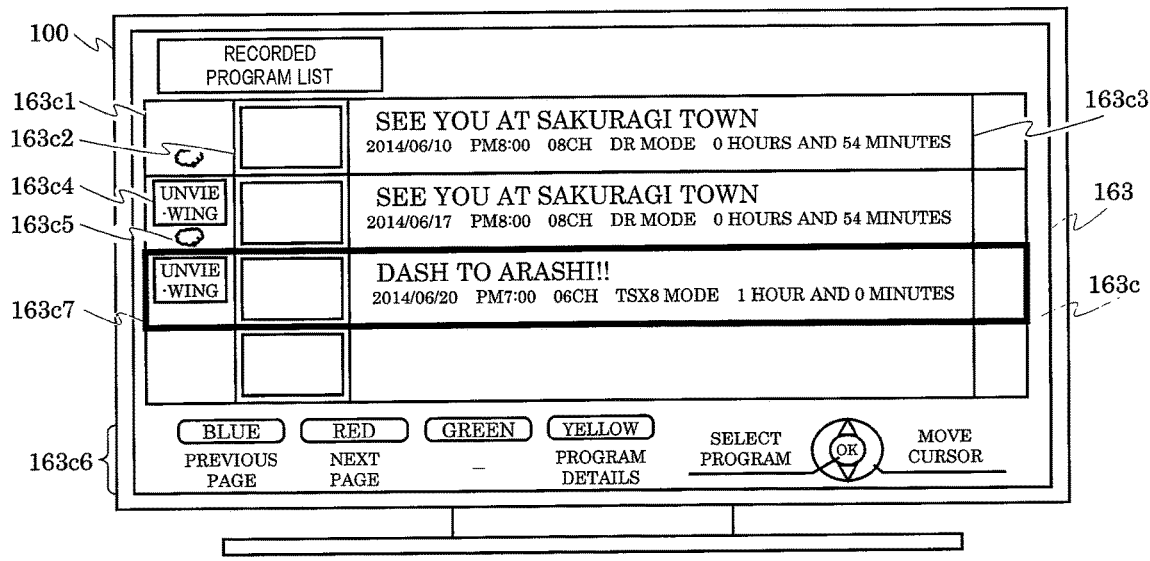
FIG. 10 is a view of a screen display of a recording-program list display screen on the broadcast reception device according to the embodiment.

FIG. 10 is a view of a screen display for describing an example of the recording-program list display screen displayed by the process at S904. The recording-program list display screen 163*c* displays: a list of recording program information 163*c*1 on each recording program stored in the recording-program information table in the recording-content storage area 1300; and an operation guide 163*c*6. The recording program information 163*c*1 mainly includes thumbnail portions 163*c*2 and program outline portions 163*c*3 that display information such as recording program titles, recording date and time, recording channels, recording modes, and recording duration. Furthermore, the recording program information 163*c*1 appropriately includes unviewing marks 163*c*4 each indicating whether each recording program has not been viewed yet, and a cloud mark 163*c*5 indicating whether the program content of each recording program has been stored in the storage of the broadcast reception device 100. Incidentally, the cloud mark 163*c*5 is displayed in a case where the program content of each recording program has not been stored in the storage of the broadcast reception device 100, namely, is displayed in a case where the scheduled recording process is performed with the "save program" key set to select "OFF" in the schedule setting key 163*b*3 on the program-detailed-information display screen 163*b*.

By operating the cursor key of the remote controller not illustrated, a program selection cursor 163*c*7 can be moved. Furthermore, by pressing down the OK key of the remote controller, the playback process can start to a recording program selected by the program selection cursor 163*c*7.

When the user operates the cursor key and the OK key of the remote controller so as to select a predetermined recording program on the recording-program list display screen 163*c* displayed by the process at S904 in FIG. 9 (S905), the reception function execution unit 1102 reads the recording-program identification information 1307, the recording-program-content storage-destination information 1308, and the recording mode 1306 of the predetermined recording program from the recording-program information table stored in the recording-content storage area 1300 (S906).

The reception function execution unit 1102 interprets the recording-program-content storage-destination information 1308 read by the process at S906, and extracts information (e.g., IP access information) for identifying, on the network, the content server (the service provider server 400 in the present embodiment) that has stored the image content of the predetermined recording program. Furthermore, the reception function execution unit 1102 transmits the recording-program identification information 1307, the recording-program-content storage-destination information 1308, and the recording mode 1306 of the predetermined recording program, to the service provider server 400 identified by the extracted IP address information through the LAN communication unit 121, and requests therefrom transmission of the image content of the predetermined recording program (S907). Incidentally, when the recording-program-content storage-destination information 1308 includes only the IP address information, the transmission of the recording-program-content storage-destination information 1308 is not required in the process at S907.

The basic operation execution unit 4101 of the service provider server 400 transmits, to the image-content management/distribution execution unit 4102, the recording-program identification information 1307, the recording-content storage-destination information 1308, and the recording mode 1306 that are related to the predetermined recording program and received through the LAN communication unit 421. The image-content management/distribution execution unit 4102 refers to the content information table stored in the metadata storage area 4200 based on the received recording-program identification information 1307. Furthermore, by acquiring the content storage location information 4202 and the content name 4203 corresponding to the program identification information 4201 agreeing with the received recording-program identification information 1307, the image content of the predetermined recording program is selected (S908). Instead of the acquisition of the content storage location information 4202 and the content name 4203, the directory information and the file name acquired by interpreting the received recording-content storage-destination information 1308 may be used.

Next, the image-content management/distribution execution unit 4102 refers to the image-content storage area 4300 based on the content storage location information 4202 and the content name 4203 acquired by the process at S908, and reads the image content of the predetermined recording program. Furthermore, the image-content management/distribution execution unit 4102 performs, to the read image content, the transcoding process corresponding to the received recording mode 1306 (S909), and then transmits the image content to the broadcast reception device 100 through the LAN communication unit 421 (S910). Incidentally, instead of the transcoding process at S909, image contents each having a different bit rate are previously prepared in the image-content storage area 4300, and thereby the image content having a predetermined bit rate may be selected depending on the received recording mode 1306. When a communication band has sufficient capacity between the service provider server 400 and the broadcast reception device 100, the transcoding process at S909 is not necessarily performed. The selection of whether the transcoding process is performed may be changed depending on a network status between the service provider server 400 and the broadcast reception device 100.

The broadcast reception device 100 that has received the image content of the predetermined recording program transmitted from the service provider server 400 transmits, to the demultiplexer 132, the image content received through the LAN communication unit 121 based on the control of the reception function execution unit 1102. Furthermore, based on the control of the broadcast-program playback unit 1102a, the device 100 performs: a demultiplexing process of each data stream in the demultiplexer 132; decode processes of the image data stream and the sound data stream in the image decoder 133 and the sound decoder 134; and the like, and outputs the image signal and the sound signal of the broadcast program through the image superimposition unit 161 and the sound selector 162 from the image display unit 163 and the speaker 164 (S911). The recording-program playback process in the broadcast reception device 100 is achieved by the above operation.

As the operation of the recording schedule process, the operation of the scheduled recording process, and the operation of the recording-program playback process have been described above, when the broadcast program is recorded, the broadcast reception device 100 according to the present embodiment is not required to individually store the program content of the broadcast program into the storage of the broadcast reception device 100, and operates to acquire, every playback, the content of the received broadcast program from the content server on the network. Incidentally, differently from a publicly-known video on demand (VOD) system that automatically accesses the content server to search and select a desired content, in the broadcast reception device 100 according to present embodiment, the user does not require paying attention to presence of the content server, and can achieve the same usability as that of a previous video tape recorder (VTR) for the recording process and the playback process of the broadcast program. Furthermore, in the broadcast reception device 100 according to the present embodiment, the recording-program information table that manages the information on the recording programs does not require having a large storage area, so that a large number of recording programs can be managed and stored. Alternatively, a storage having small capacity can manage the recording programs. That is, the broadcast reception device capable of the more useful recording process and playback process can be provided.

Second Embodiment

A second embodiment according to the present invention will be described below. Incidentally, unless otherwise noted, a configuration and an effect, etc. according to the present embodiment are the same as those according to the first embodiment. Accordingly, differences between the present embodiment and the first embodiment will be mainly described below, and descriptions of points in common will be omitted in order to avoid duplication as much as possible.

In a digital broadcasting service according to the present embodiment, a program information data stream includes program related information containing program identification information and program-content storage-destination information on a broadcast program as a scheduled-recorded target. In this case, the scheduled recording process of the broadcast program as a scheduled-recorded target can be performed at a time of acquiring the program information data stream from the digital broadcast wave in a case where the "save program" key has been set to select "OFF" in the schedule setting key 163b3 on the program-detailed-information display screen 163b illustrated in FIG. 7, namely, in a case where each program content of the broadcast program as a scheduled-recorded target is not individually stored in the storage of the broadcast reception device 100.

[Operational Sequence in Recording Schedule and Scheduled Recording]

Figure 11:
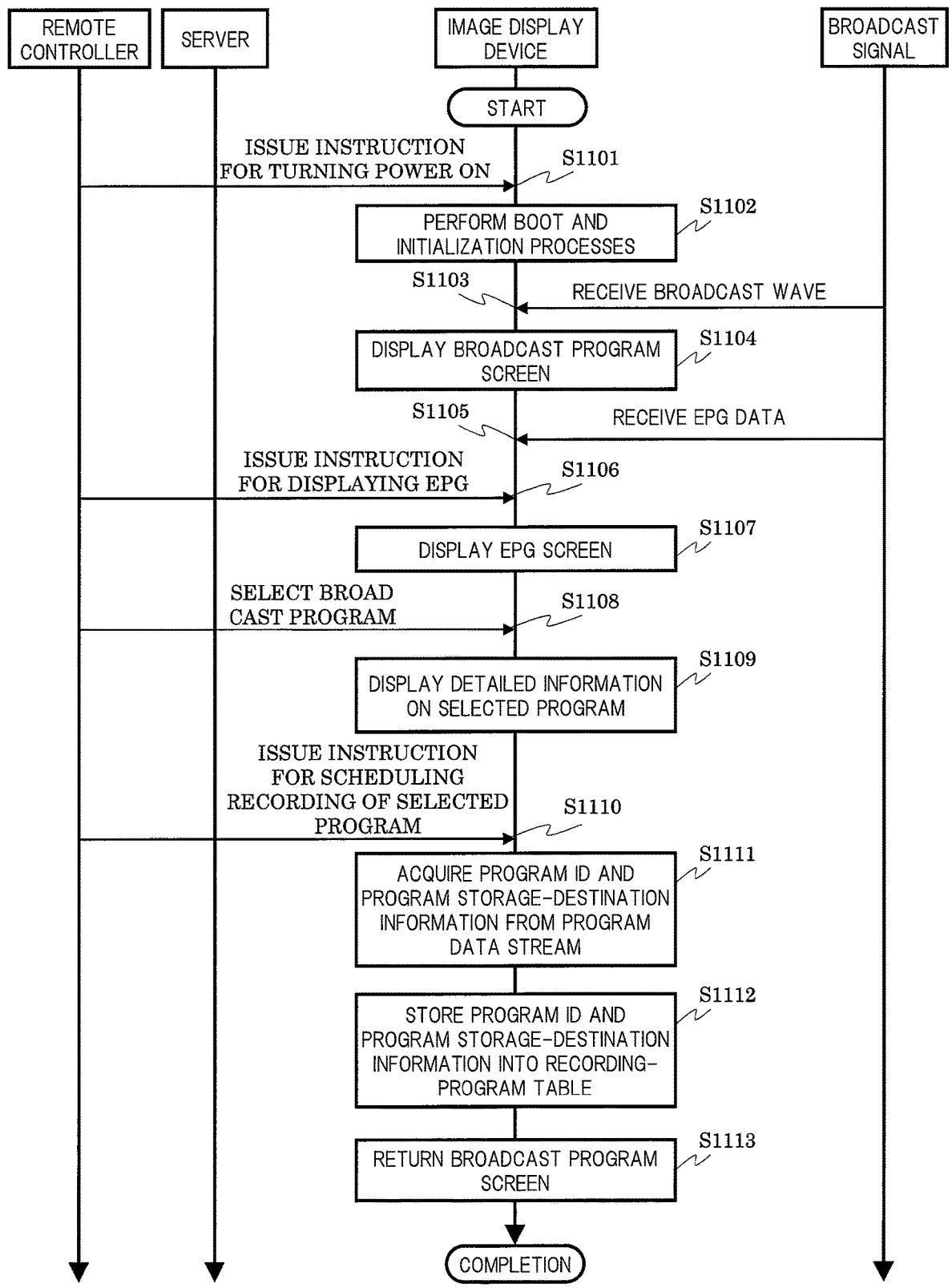
FIG. 11 is an operational sequence diagram of a broadcast reception device according to an embodiment at times of a recording schedule process and a scheduled recording process.

FIG. 11 is an operational sequence diagram for describing an example of a series of operations of the recording schedule process and the scheduled recording process in the broadcast reception device 100 according to the present embodiment.

Processes at S1101 to S1109 in the figure operate similarly to the processes at S501 to S509 in the operational sequence diagram illustrated in FIG. 5, and thus descriptions of thereof will be omitted. Incidentally, as described above, the program information data stream acquired by the process at S1105 includes the program related information containing the program identification information and the program-content storage-destination information on each broadcast program in the digital broadcasting service. When a user operates a cursor key and an OK key of a remote controller not illustrated so as to select a "recording schedule" key of an operation selection key 163b4 on the program-detailed-information display screen 163b displayed by a process at S1109 (S1110), a program recording execution unit 1104 acquires, from the program information data stream, the program related information containing the program identification information and the program-content storage-destination information on the broadcast program as a scheduled-recorded target based on the control of a reception function execution unit 1102 (S1111).

Furthermore, by the control of the program recording execution unit 1104, the program related information containing the program identification information and the program-content storage-destination information on the broadcast program as a scheduled-recorded target acquired by the process at S1111 is stored into a recording-program information table in a recording-content storage area 1300 together with information on a setting content of each item set on the program-detailed-information display screen 163b (S1112). Specifically, for example, recording-program identification information 1307 in the recording-program information table stores the acquired program identification information. Recording-program-content storage-destination information 1308 stores the acquired program-content storage-destination information. Also, broadcast-date-and-time information, broadcast-channel information, and program-title information are stored into recording-date information 1302, recording-time information 1303, recording-channel information 1304, and recording-program-title information 1305. A content set by a "recording mode" key in the schedule setting key 163b3 on the program-detailed-information display screen 163b is stored into a recording mode 1306.

When the process at S1112 is completed, the display of the program-detailed-information display screen 163b is completed so that a broadcast-program playback unit 1102a displays an image of a currently-viewing broadcast program onto an image display unit 163 (S1113). The series of processes including the recording schedule process and the scheduled recording process in the broadcast reception device 100 is completed by the above operation. The operation of the recording-program playback process in the broadcast reception device 100 according to the present embodiment is the same as that in the operational sequence diagram illustrated in FIG. 9, and thus descriptions thereof will be omitted.

At a time of performing the broadcast program selection and the recording schedule process using an EPG, the broadcast reception device 100 according to the present embodiment can simultaneously perform the scheduled recording process of the selected broadcast program, so that this is convenient to the user. Further, for the recording schedule process of the selected broadcast program, a storage process is not required to be performed to a scheduled information table in a scheduled-information storage area 1200, so that the process is simplified. That is, the broadcast reception device capable of the more useful recording process and playback process can be provided.

Third Embodiment

A third embodiment according to the present invention will be described below. Incidentally, unless otherwise noted, a configuration and an effect, etc. according to the present embodiment are the same as those according to the second embodiment. Accordingly, differences between the present embodiment and the second embodiment will be mainly described below, and descriptions of points in common will be omitted in order to avoid duplication as much as possible.

At a time of performing the broadcast program selection and the recording schedule process using the EPG, the broadcast reception device 100 described in the second embodiment can perform the scheduled recording process of the selected broadcast program. This agrees with the fact that: the broadcast program selection and the recording schedule process are completed using the EPG, and then the scheduled recording process is completed to the selected broadcast program; and even before the original broadcast starting time of the selected broadcast program, the playback process can be performed to the image content of the selected broadcast program (namely, the program content of the recording program). Meanwhile, viewing the image content of the broadcast program before the original broadcast starting time of the broadcast program is unfavorable to the service provider that provides the broadcast program. Therefore, a broadcast reception device 100 according to the present embodiment handles restriction of playback-starting allowable date and time of the recording program.

[Operational Sequence in Recording-Program Playback]

Figure 12:
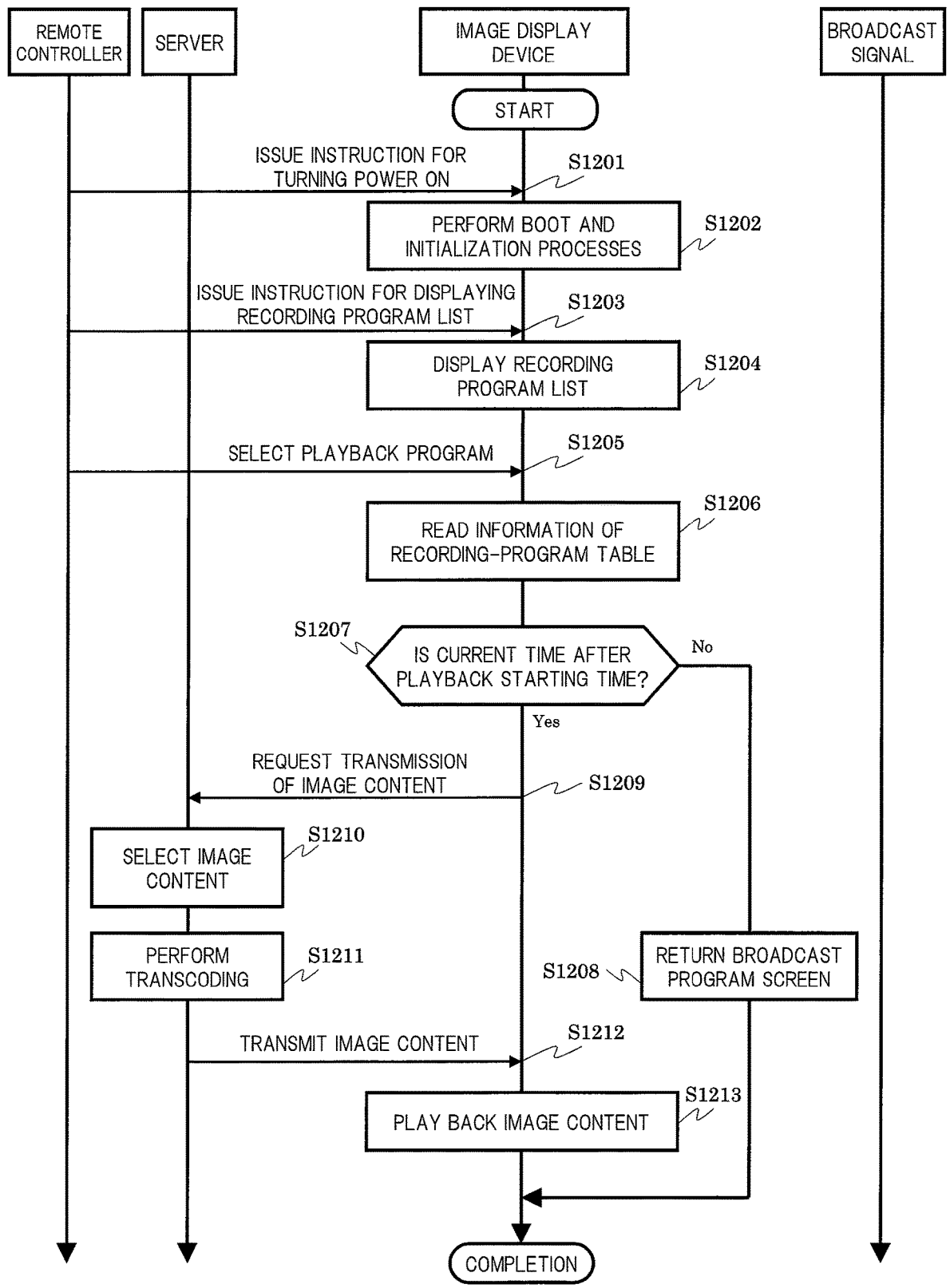
FIG. 12 is an operational sequence diagram of a broadcast reception device according to an embodiment at a time of a recording-program playback process.

FIG. 12 is an operational sequence diagram for describing an example of an operation of a recording-program playback process in the broadcast reception device 100 according to the present embodiment. Incidentally, a series of operations of the recording schedule process and the scheduled recording process in the broadcast reception device 100 according to the present embodiment is the same as that in the operational sequence diagram illustrated in FIG. 11, and thus descriptions thereof will be omitted.

Processes at S1201 to S1204 operate similarly to the processes at S901 to S904 in the operational sequence diagram illustrated in FIG. 9, and thus descriptions thereof will be omitted. When a user operates a cursor key and an OK key of a remote controller not illustrated so as to select a predetermined recording program on a recording-program list display screen 163c displayed by a process at S1204 (S1205), a reception function execution unit 1102 reads recording-date information 1302, recording-time information 1303, recording-program identification information 1307, recording-program-content storage-destination information 1308, and a recording mode 1306 for the predetermined recording program, from a recording-program information table stored in a recording-content storage area 1300 (S1206).

Incidentally, in a digital broadcasting service according to the present embodiment, program identification information, program-content storage-destination information, and playback-starting allowable date and time information on a broadcast program as a scheduled-recorded target are stored, as program related information, in a program information data stream. The broadcast reception device 100 according to the present embodiment also performs the series of operations of the recording schedule process and the scheduled recording process similarly to the operational sequence diagram illustrated in FIG. 11. In process at S1112, however, the program identification information and the program-content storage-destination information on the broadcast program as a scheduled-recorded target are stored into the recording-program identification information 1307 and the recording-program-content storage-destination information 1308 of the recording-program information table in the recording-content storage area 1300, and furthermore the playback-starting allowable date and time information on the broadcast program as a scheduled-recorded target is stored into the recording-date information 1302 and the recording-time information 1303 of the recording-program information table. That is, the recording-date information 1302 and the recording-time information 1303 read by the process at S1206 are information on the playback-starting allowable date and time of the image content relating to the selected predetermined recording program.

After the process at S1206, the reception function execution unit 1102 compares time information on a built-in clock not illustrated with the recording-date information 1302 and the recording-time information 1303 read at S1206 (S1207). When current time is before the playback-starting allowable date and time of the image content relating to the selected predetermined recording program designated by the recording-date information 1302 and the recording-time information 1303 (S1207: No), the reception function execution unit 1102 does not perform the playback process of the selected predetermined recording program, and causes a broadcast-program playback unit 1102a to display the image of the currently-viewing broadcast program onto an image display unit 163 (S1208). Meanwhile, when the current time is after the playback-starting allowable date and time of the image content relating to the selected predetermined recording program designated by the recording-date information 1302 and the recording-time information 1303 (S1207: Yes), processes at S1209 to S1213 are performed so that the playback process of the image content relating to the selected predetermined recording program is performed. Incidentally, the processes at S1209 to S1213 operate similarly to the processes at S907 to S911 in the operational sequence diagram illustrated in FIG. 9, and thus descriptions thereof will be omitted.

As described above, the broadcast reception device 100 according to the present embodiment can also acquire the same effect as those according to the first embodiment and the second embodiment. Further, the broadcast reception device 100 according to the present embodiment can provide the restriction to the playback-starting allowable date and time of the recording program, and can prevent the image content relating to the broadcast program from being viewed before the original broadcast starting time of the broadcast program. That is, the broadcast reception device capable of the more useful recording process and playback process can be provided.

Incidentally, the playback-starting allowable date and time information may be the original broadcast starting time of the broadcast program, may be an original broadcast ending time of the broadcast program, or may be arbitrarily specified different time.

Fourth Embodiment

A fourth embodiment according to the present embodiment will be described below. Incidentally, unless otherwise noted, a configuration and an effect etc. according to the present embodiment are the same as those according to the third embodiment. Accordingly, differences between the present embodiment and the third embodiment will be mainly described below, and descriptions of points in common will be omitted in order to avoid duplication as much as possible.

[Operational Sequence in Recording-Program Playback]

Figure 13:
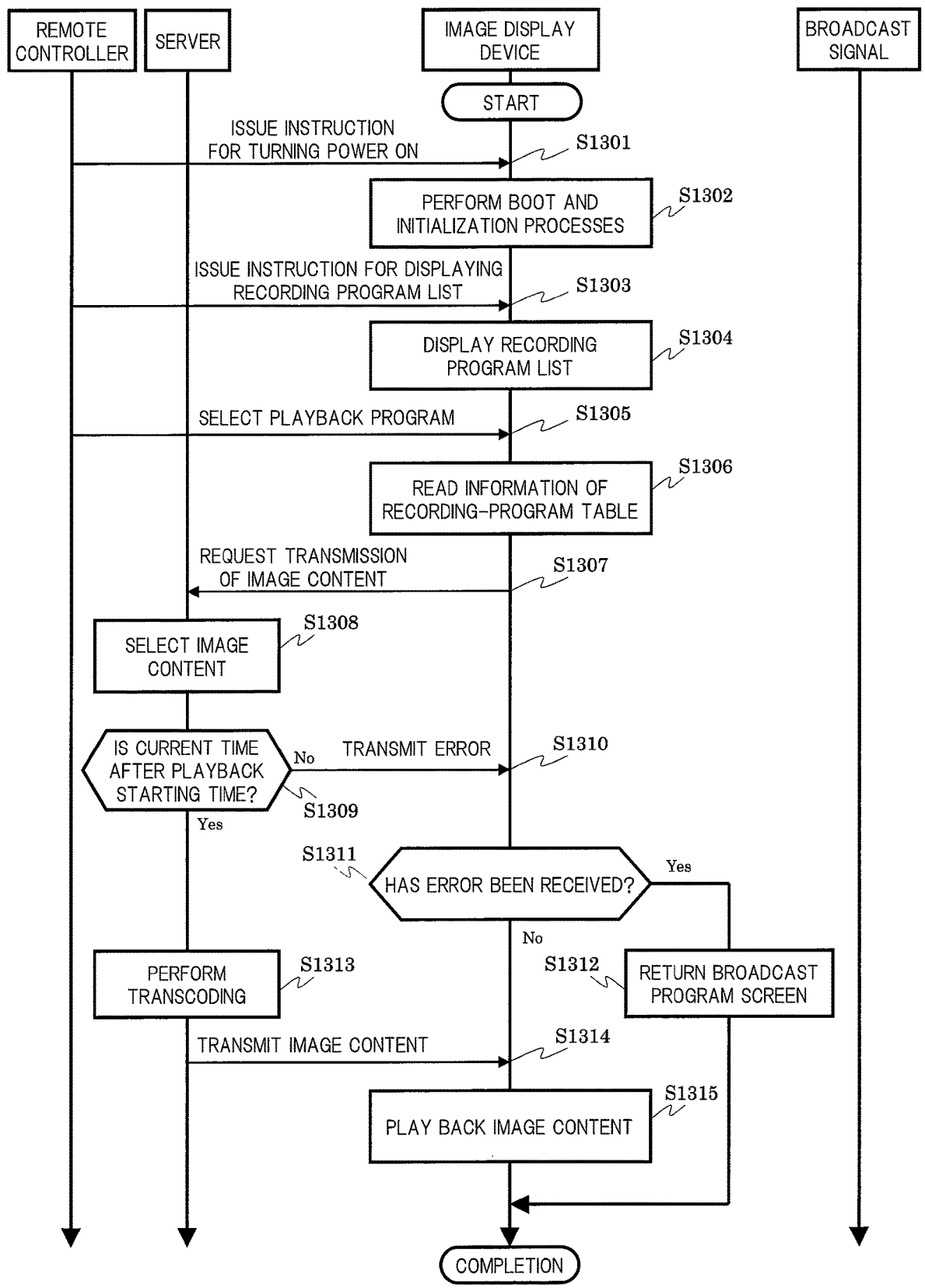
FIG. 13 is an operational sequence diagram of a broadcast reception device according to an embodiment at a time of a recording-program playback process.

FIG. 13 is an operational sequence diagram for describing an example of an operation of a recording-program playback process in a broadcast reception device 100 according to the present embodiment. Incidentally, a series of operations of a recording schedule process and a scheduled recording process in the broadcast reception device 100 according to the present embodiment is performed similarly to the operational sequence diagram illustrated in FIG. 11. That is, in a process at S1112, playback-starting allowable date and time information on a broadcast program as a scheduled-recorded target is not stored into recording-date information 1302 and recording-time information 1303 of a recording-program information table.

Processes at S1301 to S1307 in the figure operate similarly to the processes at S901 to S907 in the operational sequence diagram illustrated in FIG. 9, and thus descriptions thereof will be omitted.

A basic operation execution unit 4101 of a service provider server 400 transmits, to an image-content management/distribution execution unit 4102, recording-program identification information 1307, recording-content storage-destination information 1308, and a recording mode 1306 of a predetermined recording program received through the LAN communication unit 421. The image-content management/distribution execution unit 4102 refers to a content information table stored in a metadata storage area 4200 based on the received recording-program identification information 1307. Furthermore, by acquiring content storage location information 4202 and a content name 4203 corresponding to program identification information 4201 agreeing with the received recording-program identification information 1307, an image content relating to the predetermined recording program is selected (S1308). Instead of the acquisition of the content storage location information 4202 and the content name 4203, directory information and a file name acquired by interpreting the received recording-content storage-destination information 1308 may be used.

The image-content management/distribution execution unit 4102 further acquires content broadcast-date information 4206 and content broadcast-time information 4207 so as to compare time information on a built-in clock not illustrated with the content broadcast-date information 4206 and the content broadcast-time information 4207 that have been acquired (S1309). The content broadcast-date information 4206 and the content broadcast-time information 4207 in the content information table stored in the metadata storage area 4200 are information on the original broadcast date and time of the corresponding image content, and information on restriction of the playback-starting allowable date and time of the image content.

When current time is before the playback-starting allowable date and time of the selected image content designated by the content broadcast-date information 4206 and the content broadcast-time information 4207 in the process at S1309 (S1309: No), the image-content management/distribution execution unit 4102 transmits an error to the broadcast reception device 100 (S1310). The broadcast reception device 100 that has received the error from the service provider server 400 (S1311) notifies a user of the fact that the playback process of the image content relating to the predetermined recording program cannot be performed by control of a reception function control unit 1102. Furthermore, a broadcast-program playback unit 1102a displays the image of the currently-viewing broadcast program on an image display unit 163 (S1312), and then a series of processes thereof is completed. Incidentally, a notification process may clarify, to the user, the playback-starting allowable time of the image content relating to the predetermined recording program.

Meanwhile, when the current time is after the playback-starting allowable date and time of the selected image content designated by the content broadcast-date information 4206 and the content broadcast-time information 4207 (S1309: Yes), the processes at S1313 to S1315 are performed so that the playback process of the image content relating to the selected predetermined recording program is performed. Incidentally, processes at S1313 to S1315 operate similarly to the processes at S909 to S911 in the operational sequence diagram illustrated in FIG. 9, and thus descriptions thereof will be omitted.

As described above, the broadcast reception device 100 according to the present embodiment can also acquire the same effect as that according to the third embodiment. In a digital broadcasting service according to the present embodiment, the playback-starting allowable date and time information is not required to be included in a program data stream, and the broadcast reception device 100 is not required to perform a process to the restriction of the playback-starting allowable date and time of the recording program. That is, the broadcast reception device capable of the more useful recording process and playback process can be provided.

Fifth Embodiment

A fifth embodiment of the present invention will be described below. Incidentally, unless otherwise noted, a configuration and an effect etc. according to the present embodiment are the same as those according to the first embodiment. Accordingly, differences between the present embodiment and the first embodiment will be mainly described below, and descriptions of points in common will be omitted in order to avoid duplication as much as possible.

In a broadcast reception device 100 according to the present embodiment, a description will be made of an example of a case where an authentication process is performed with a content server storing an image content relating to a broadcast program (or recording program) as a scheduled-recorded target at a time of operations of a scheduled recording process and a recording-program playback process.

[Software Configuration of Broadcast Reception Device]

Figure 14A:
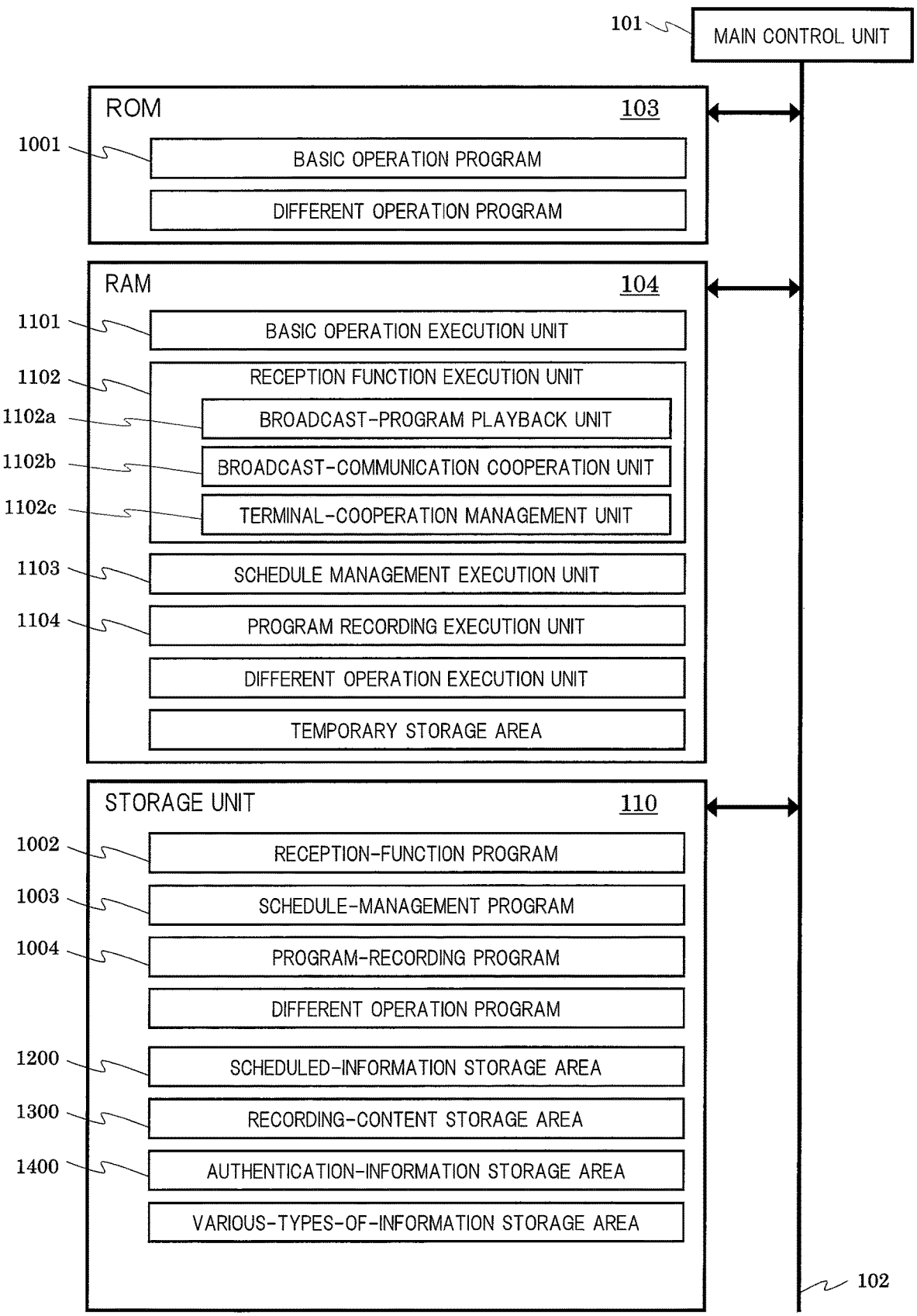
FIG. 14A is a diagram of a software configuration of a broadcast reception device according to an embodiment.

FIG. 14A is a diagram of a software configuration of the broadcast reception device 100 according to the present embodiment, and illustrates each software configuration of a ROM 103, a RAM 104, and a storage unit 110. In the block diagram of the software configuration of the broadcast reception device 100 according to the present embodiment, an authentication-information storage area 1400, which stores login information etc. when the broadcast reception device 100 accesses each content server, is added to the storage unit 110 in comparison to the diagram of the software configuration of the broadcast reception device 100 described in the first embodiment (refer to FIG. 2B).

Figures 14B, 15A:
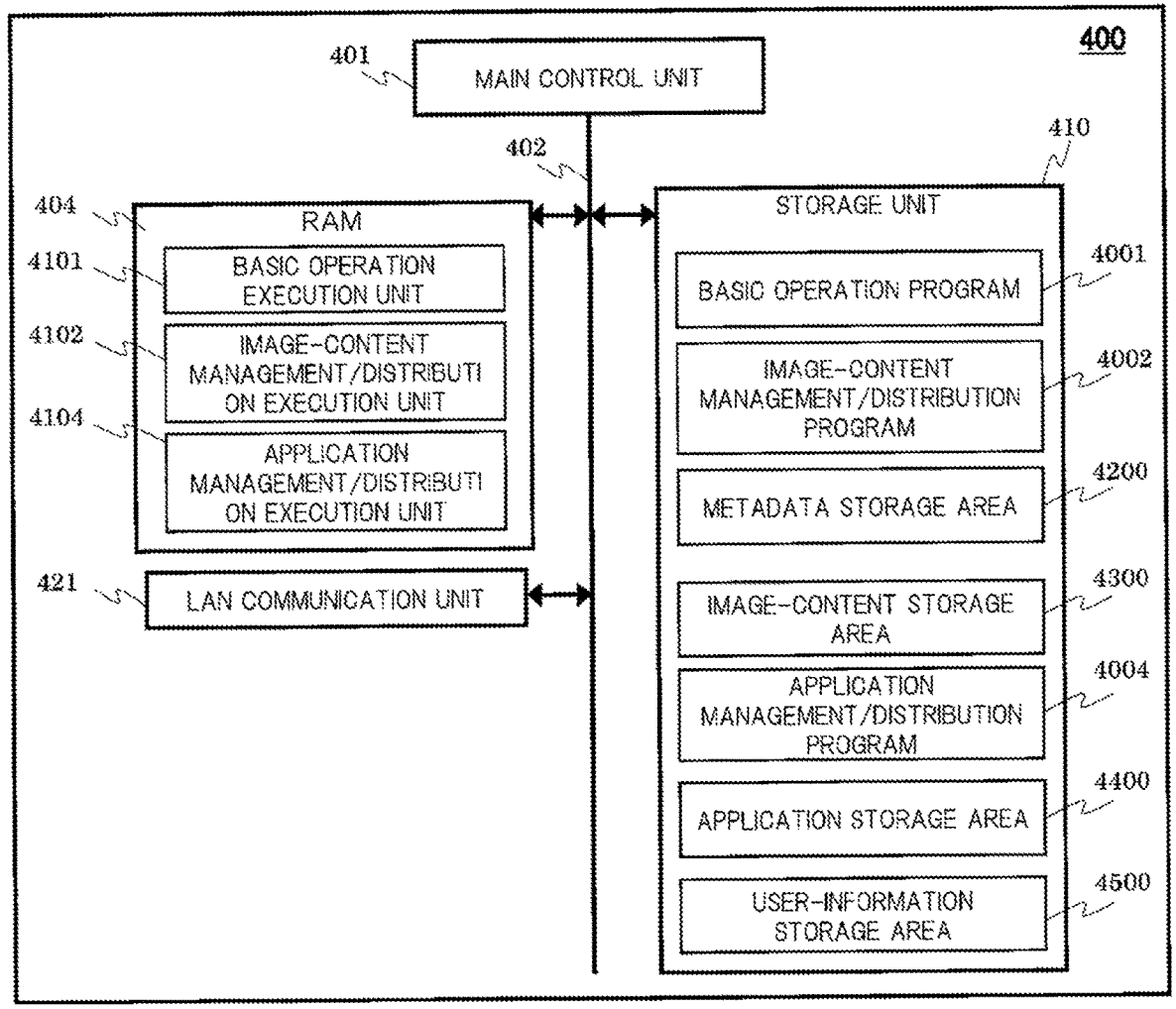
FIG. 14B is a conceptual diagram for describing a data format of an authentication information table according to the embodiment.
FIG. 15A is a block diagram of a service provider server according to the embodiment.

FIG. 14B is a conceptual diagram for describing an example of a data format of an authentication information table stored in the authentication-information storage area 1400. The authentication information table includes information such as a reference number 1401, service name information 1402, access destination information 1403, login name information 1404, password information 1405, and credit card information 1406. Different information may be further included.

The reference number 1401 is used for managing respective pieces of authentication information stored in the authentication information table. The service name information 1402 is information on a service name of a content distribution service accessed by the broadcast reception device 100. The access destination information 1403 is identification information such as an IP address for identifying, on a network, a server device that performs the content distribution service. The login name information 1404 and the password information 1405 are a login name and a password used in accessing the server device that performs the content distribution service by the broadcast reception device 100. The credit card information 1406 is information relating to a credit card possessed by a user of the broadcast reception device 100.

[Configuration of Service Provider Server]

FIG. 15A is a block diagram showing an example of an internal configuration of the service provider server 400. The service provider server 400 according to the present embodiment also includes a main control unit 401, a system bus 402, a RAM 404, a storage unit 410, and a LAN communication unit 421. In comparison to the internal configuration of the service provider server 400 described in the first embodiment (FIG. 4A), a user-information storage area 4500, which stores information etc. on the user allowing access to the service provider server 400, is added to the storage unit 410.

Figures 15B, 16:
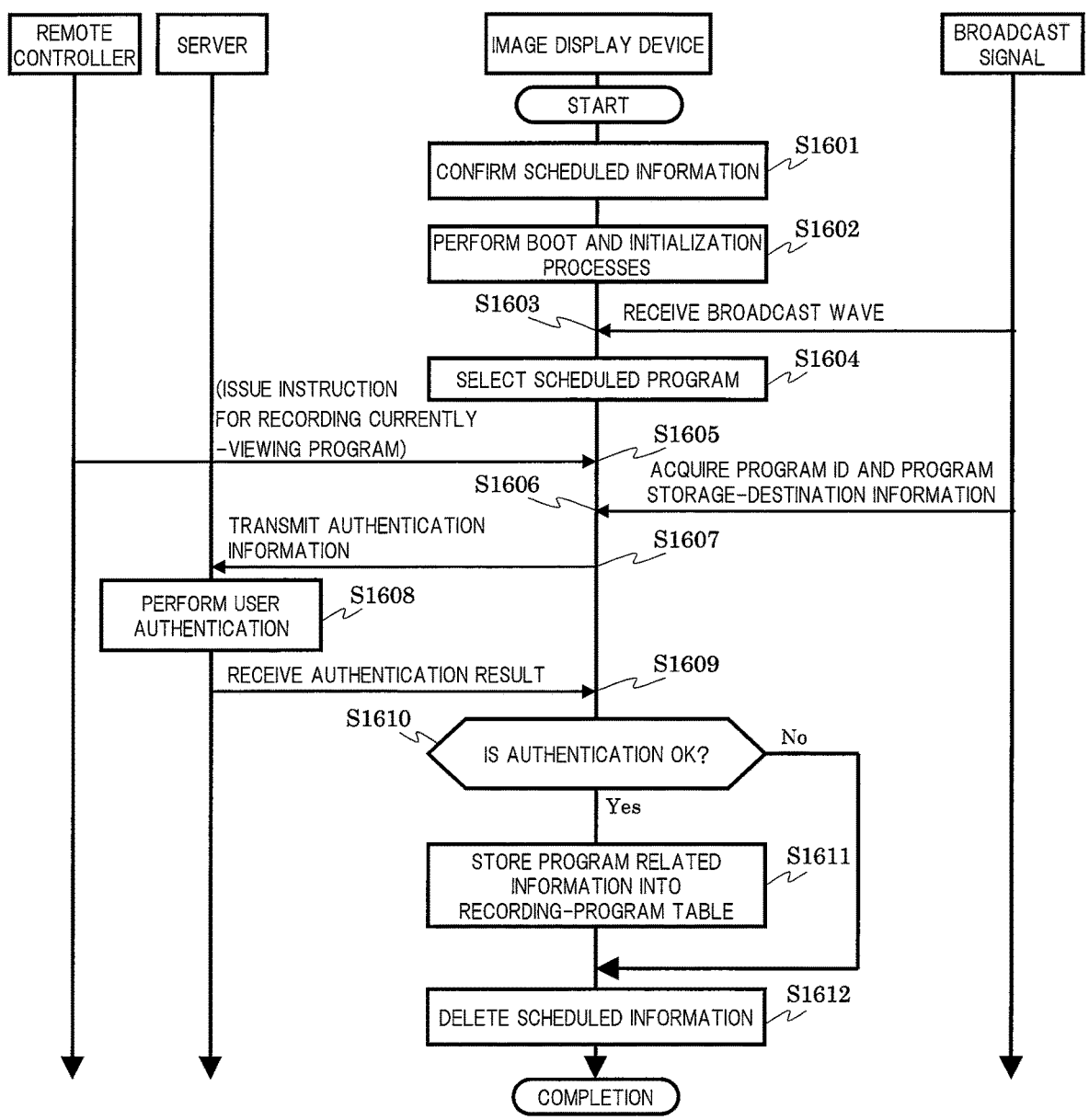
FIG. 15B is a conceptual diagram for describing a data format of a user information table according to the embodiment.
FIG. 16 is an operational sequence diagram of the broadcast reception device according to the embodiment at a time of a scheduled recording process.

FIG. 15B is a conceptual diagram for describing an example of a data format of a user information table stored in the user-information storage area 4500. The user information table includes information such as a reference number 4501, user name information 4502, user associated information 4503, password information 4504, and expiration date information 4505. Different information may be further included.

The reference number 4501 is used for managing respective pieces of user information stored in the user information table. The user name information 4502 is identification information for identifying users allowing access to the service provider server 400. The user associated information 4503 is associated information on each of the users (e.g., address and telephone number). The password information 4504 is a password registered for accessing the service provider server 400 by each of the users. The expiration date information 4505 is information relating to an expiration date of access permission of each user to the service provider server 400.

An operation of the broadcast reception device 100 according to the present embodiment will be described below.

[Operational Sequence in Scheduled Recording]

FIG. 16 is an operational sequence diagram for describing an example of an operation of the scheduled recording process in the broadcast reception device 100 according to the present embodiment. Incidentally, processes at S1601 to S1606 operate similarly to the processes at S801 to S806 in the operational sequence diagram illustrated in FIG. 8, and thus descriptions thereof will be omitted.

When program related information containing program identification information and program-content storage-destination information on the broadcast program as a scheduled-recorded target is acquired by the process at S1606, a reception function execution unit 1102 interprets the acquired program-content storage-destination information, and extracts information (e.g., IP address information) for identifying, on the network, the content server (service provider server 400 in the present embodiment) storing the image content relating to the broadcast program as the scheduled-recorded target. Furthermore, the login name 1404 and the password 1405 corresponding to the service provider server 400 are acquired with reference to the authentication information table in the authentication-information storage area 1400. After that, the reception function execution unit 1102 transmits, to the service provider server 400, the login name 1404 and the password 1405 that have been acquired, and requests user authentication (S1607). Incidentally, the login name and the password, which are transmitted to the service provider server 400, may be appropriately inputted by operating a remote controller not illustrated.

A basic operation execution unit 4101 of the service provider server 400 transmits the login name 1404 and the password 1405, which are received through the LAN communication unit 421, to an image-content management/distribution execution unit 4102. Based on the received login name 1404, the image-content management/distribution execution unit 4102 refers to the user information table stored in the user-information storage area 4500. Furthermore, the password information 4504 corresponding to the user name information 4502 agreeing with the received login name 1404 is compared with the received password information 1405, and additionally the expiration date information 4505 is confirmed so that a user authentication process is performed (S1608). In the process at S1608, when the received password information 1405 agrees with the password information 4504, the user authentication succeeds. When the received password information 1405 does not agree with the password information 4504, when the information stored in the expiration date information 4505 indicates that the expiration date has expired, or when no user name agreeing with the received login name 1404 is present in the user information table, the user authentication fails. The image-content management/distribution execution unit 4102 transmits an authentication result in the process at S1608 to the broadcast reception device 100 through the LAN communication unit 421.

The broadcast reception device 100, which has received the authentication result from the service provider server 400 (S1609), confirms the received authentication result based on the control of the program recording execution unit 1104 (S1610). As a result, when the user authentication process succeeds in the service provider server 400 (S1610: Yes), the program recording execution unit 1104 stores, into a recording-program information table in a recording-content storage area 1300, the program related information containing the program identification information and the program-content storage-destination information on the broadcast program as a scheduled-recorded target acquired by the process at S1606, together with the information described in a scheduled information table in a scheduled-information storage area 1200 referenced by the process at S1601 (S1611). When the process at S1611 is completed, a schedule management execution unit 1103 deletes the scheduled information stored into the scheduled information table in the scheduled-information storage area 1200 (S1612).

Meanwhile, when the user authentication process fails in the service provider server 400 (S1610: No), the process at S1611 is not performed and the schedule management execution unit 1103 deletes the scheduled information stored into the scheduled information table in the scheduled-information storage area 1200 (S1612). Alternatively, the program content (TS or ES) of the broadcast program as a scheduled-recorded target outputted from the demultiplexer 132 may be stored, as it is or after the performance of the transcoding process, into the recording-content storage area 1300 in the storage unit 110 or into the HDD coupled to the extended I/F unit 124.

[Operational Sequence in Recording-Program Playback]

Figure 17:
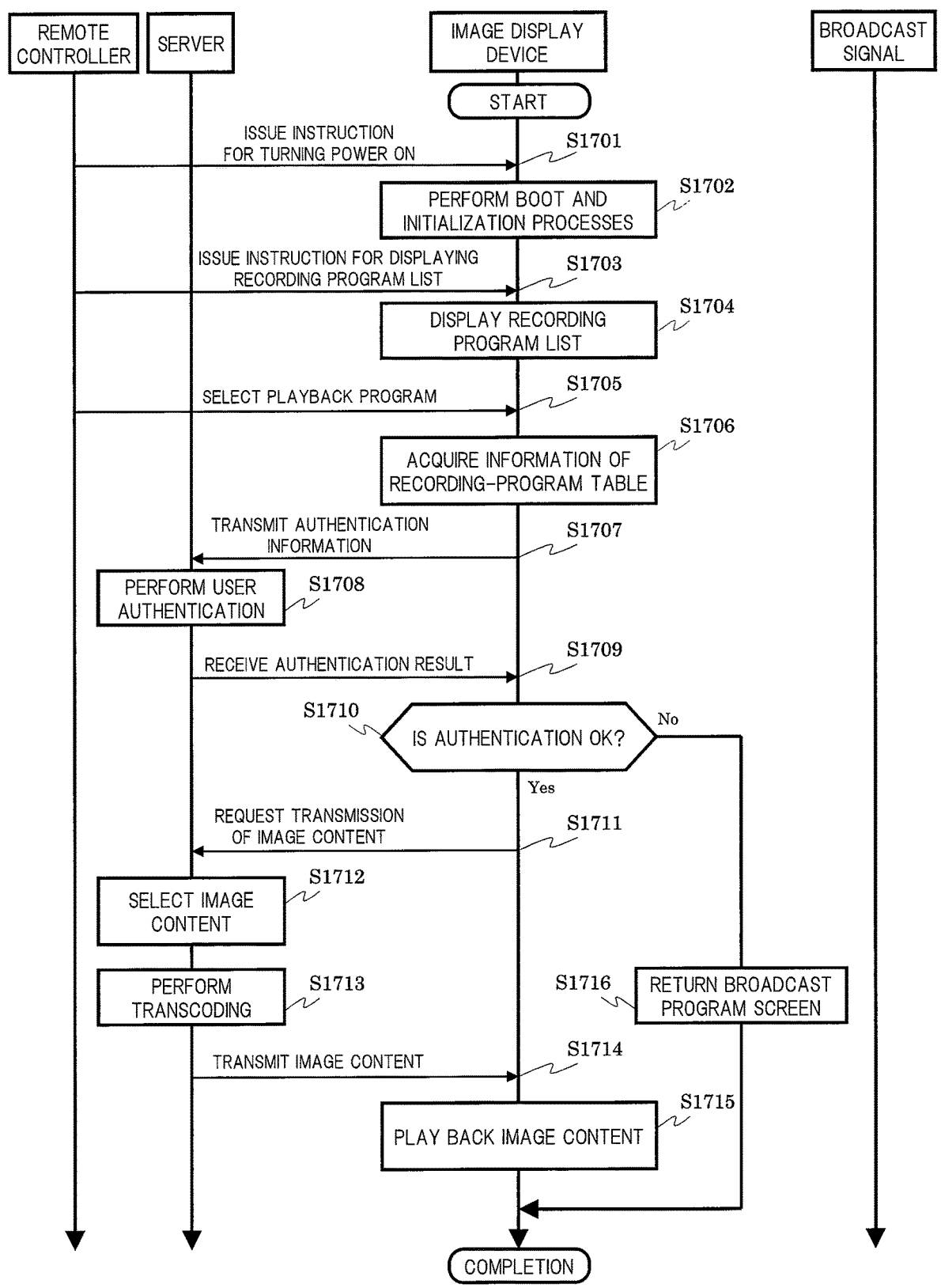
FIG. 17 is an operational sequence diagram of the broadcast reception device according to the embodiment at a time of a recording-program playback process.

FIG. 17 is an operational sequence diagram for describing an example of an operation of a recording-program playback process in the broadcast reception device 100 according to the present embodiment. Incidentally, processes at S1701 to S1706 in the figure are the same as the processes at S901 to S906 in the operational sequence diagram illustrated in FIG. 9, and thus descriptions thereof will be omitted.

Recording-program identification information 1307, recording-program-content storage-destination information 1308, and a recording mode 1306 relating to a predetermined recording program selected by the process at S1705 are read from the recording-program information table stored in the recording-content storage area 1300 by the process at S1706, and then the reception function execution unit 1102 interprets the read recording-program-content storage-destination information 1308 and extracts, on the network, information (e.g., IP address information) for identifying the content server (the service provider server 400 in the present embodiment) storing the image content relating to the recording program. Furthermore, the login name 1404 and the password 1405 corresponding to the service provider server 400 are acquired with reference to the authentication information table in the authentication-information storage area 1400. After that, the reception function execution unit 1102 transmits, to the service provider server 400, the login name 1404 and the password 1405 that have been acquired, and requests user authentication (S1707). Incidentally, the login name and the password, which are transmitted to the service provider server 400, may be appropriately inputted by operating a remote controller not illustrated.

A process at S1708 in the service provider server 400 is the same as the process at S1608 in the operational sequence diagram illustrated in FIG. 16, and thus descriptions thereof will be omitted.

The broadcast reception device 100 that has received an authentication result from the service provider server 400 (S1709) confirms the received authentication result by the control of the reception function execution unit 1102 (S1710). As a result, when the user authentication process succeeds in the service provider server 400 (S1710: Yes), processes at S1711 to S1715 are performed. Incidentally, the processes at S1711 to S1715 are the same as the processes at S907 to S911 in the operational sequence diagram illustrated in FIG. 9, and thus descriptions thereof will be omitted. The broadcast reception device 100 achieves the recording-program playback process to the predetermined recording program by the above operation.

Meanwhile, when the user authentication process fails in the service provider server 400 (S1710: No), the processes at S1711 to S1715 are not performed, namely, the recording-program playback process is not performed to the predetermined recording program, but a broadcast-program playback unit 1102a displays the image of the currently-viewing broadcast program on the image display unit 163 (S1716).

As the operation of the scheduled recording process and the operation of the recording-program playback process are described above, the broadcast reception device 100 according to the present embodiment can perform the authentication process with the service provider server 400 storing the image content relating to the broadcast program as a recorded target (or recording program) at a time of the operation of the scheduled recording process and the operation of the recording-program playback process. That is, only the broadcast reception device 100 possessed by the user, who has previously made a contract with the service provider that provides the broadcast programs, can acquire the image content provided by the service provider.

Incidentally, the login name 1404 and the password 1405 are transmitted together with the credit card information 1406 in the process at S1607 in the operational sequence diagram illustrated in FIG. 16, or in the process at S1707 in the operational sequence diagram illustrated in FIG. 17 so that a charging process may be performed simultaneously with the user authentication process in performing the scheduled recording process or in performing the recording-program playback process. For example, the charging process depending on the image content relating to the broadcast program as a scheduled-recorded target may be subjected to the user during the scheduled recording process, and then the image content may be viewed with no charging during the recording-program playback process to the image content. Alternatively, no charging process may be subjected to the user during the scheduled recording process of the broadcast program as a scheduled-recorded target, but the charging process may be given when the recording-program playback process is performed to the image content relating to the broadcast program. Further, a fee of the charging process may be varied depending on length of playback duration, image quality, popularity of the image content, or the like.

Sixth Embodiment

A sixth embodiment of the present invention will be described below. Incidentally, unless otherwise noted, a configuration and an effect etc. according to the present embodiment are the same as those according to the first embodiment. Accordingly, differences between the present embodiment and the first embodiment will be mainly described below, and descriptions of points in common will be omitted in order to avoid duplication as much as possible.

A broadcast reception device 100 according to the present embodiment operates a scheduled recording process similarly to that in the operational sequence diagram illustrated in FIG. 8. Incidentally, in a process at S807, at the same time that the program related information containing the program identification information and the program-content storage-destination information on the broadcast program as a scheduled-recorded target acquired by the process at S806 is stored into the recording-program information table in the recording-content storage area 1300, the program content (TS or ES) of the broadcast program as the scheduled-recorded target is stored in the recording-content storage area 1300. The content processing unit 151 may perform a transcoding process, as the need arises, to the program content of the broadcast program as the scheduled-recorded target based on setting of the "recording mode" key in the schedule setting key 163b3 on the program-detailed-information display screen 163b. Further, besides the program-content storage-destination information acquired by the process at S806, information on a storage location of the program content in the storage of the broadcast reception device 100 is stored in the recording-program-content storage-destination information 1308 of the recording-program information table in the recording-content storage area 1300.

Additionally, in a digital broadcasting service according to the present embodiment, the program content of each broadcast program distributed through the broadcast wave transmitted from the radio wave tower 300T has a resolution of 1920×1080 pixels, and the image content relating to each of the broadcast programs available from the service provider server 400 has a resolution of 7680×4320 pixels.

[Operational Sequence in Recording-Program Playback]

Figure 18:
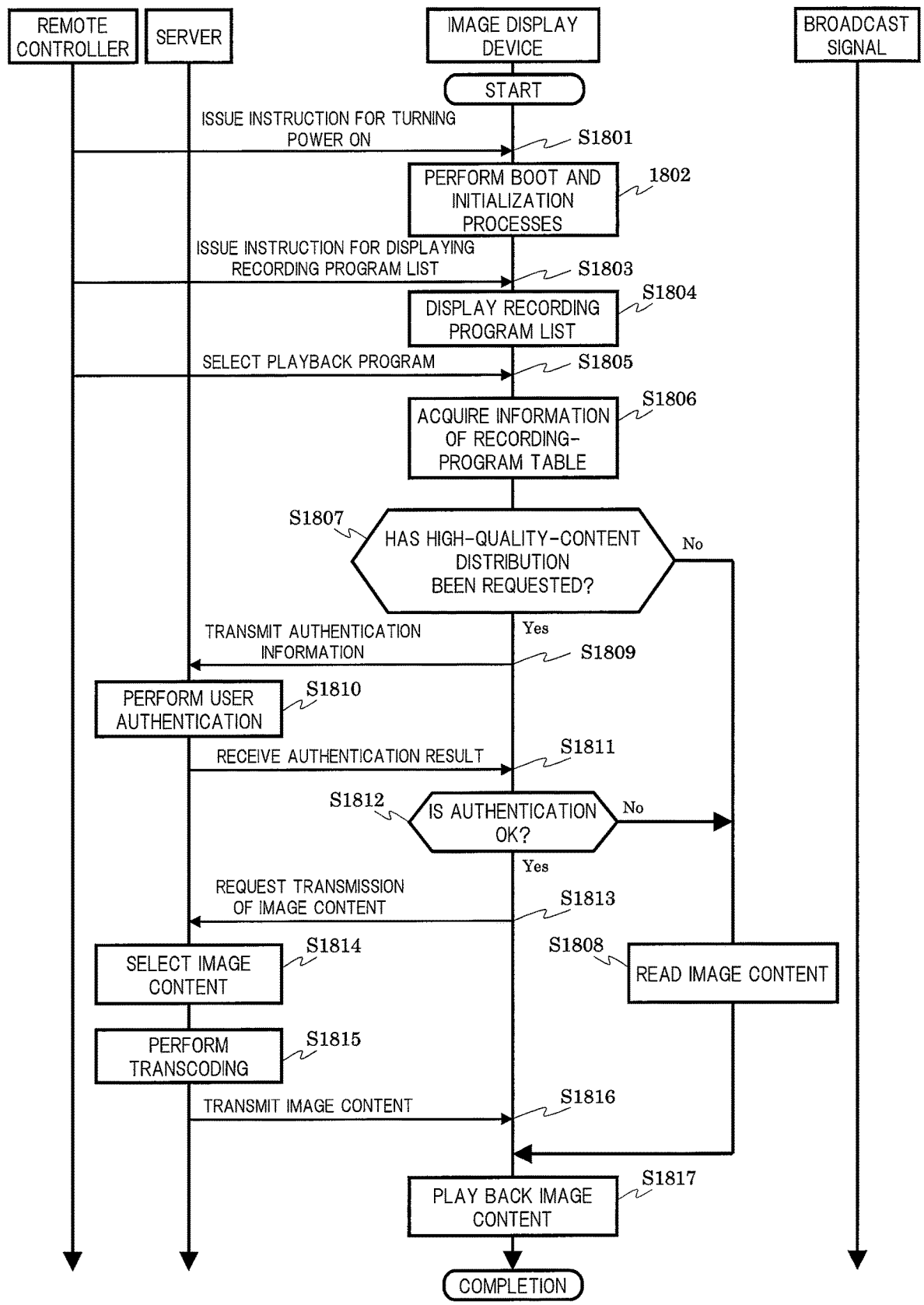
FIG. 18 is an operational sequence diagram of a broadcast reception device according to an embodiment at a time of a recording-program playback process.

FIG. 18 is an operational sequence diagram for describing an example of an operation of a recording-program playback process in the broadcast reception device 100 according to the present embodiment. Incidentally, processes at S1801 to S1806 in the figure are the same as the processes at S901 to S906 in the operational sequence diagram illustrated in FIG. 9, and thus descriptions thereof will be omitted.

Recording-program identification information 1307, recording-program-content storage-destination information 1308, and a recording mode 1306 for a predetermined recording program selected by the process at S1805 are read by the process at S1806 from the recording-program information table stored in the recording-content storage area 1300, and thereafter a reception function execution unit 1102 displays a content-distribution confirmation screen on the image display unit 163 (S1807). The content-distribution confirmation screen is a screen display for asking a user whether the recording-program playback process is performed to the selected predetermined recording program by acquiring the program content (a resolution of 7680×4320 pixels) from the service provider server 400 or by reading the program content (a resolution of 1920×1080 pixels) stored in the recording-content storage area 1300.

Figure 19:
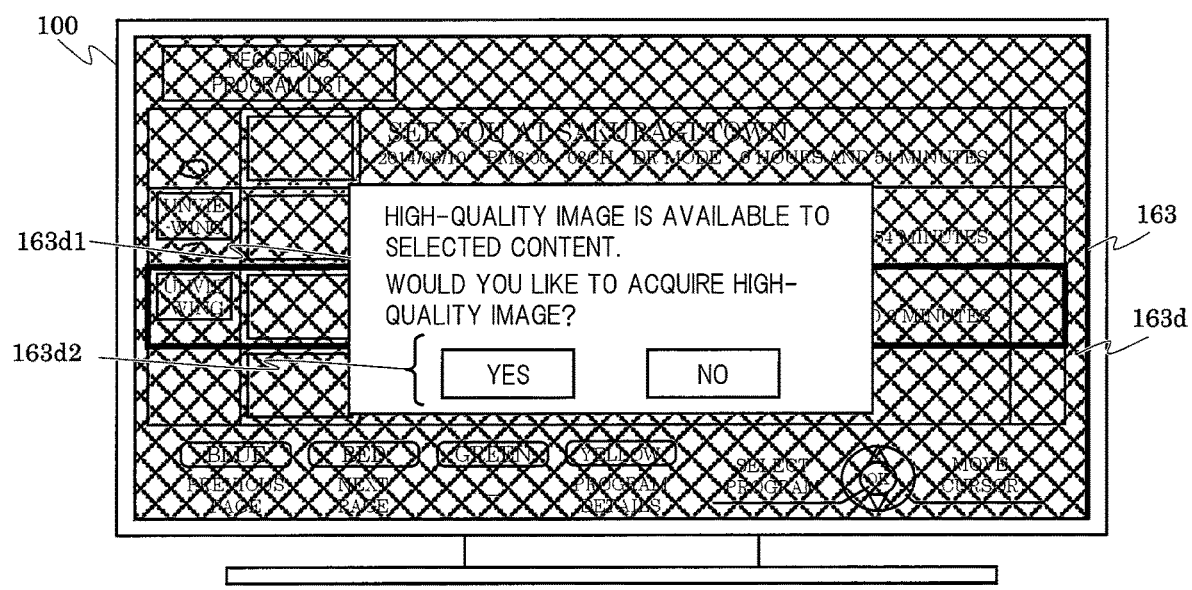
FIG. 19 is a view of a screen display of a content-distribution confirmation screen on the broadcast reception device according to the embodiment.

FIG. 19 is a view of a screen display for describing an example of the content-distribution confirmation screen displayed by the process at S1807. The content-distribution confirmation screen 163d includes: a message box 163d1 that displays a message for asking the user whether the image content relating to the selected predetermined recording program is acquired from the service provider server 400; and a selection-operation key 163d2 for selecting an operation. When a "Yes" key in the selection-operation key 163d2 is selected by operating a cursor key and an OK key of a remote controller not illustrated, the broadcast reception device 100 performs a process of acquiring the image content from the service provider server 400. When a "No" key in the selection-operation key 163d2 is selected by operating the remote controller, the broadcast reception device 100 does not perform the process of acquiring the image content from the service provider server 400.

On the content-distribution confirmation screen 163d displayed by the process at S1807 in FIG. 18, when the user operates the cursor key and the OK key of the remote controller so as to select the "No" key in the selection-operation key 163*d*2 (S1807: No), a program recording execution unit 1104 reads the program content (a resolution of 1920×1080 pixels) of the selected predetermined recording program stored in the recording-content storage area 1300 based on the information on the recording-program-content storage-destination information 1308 in the recording-program information table (S1808). Furthermore, the reception function execution unit 1102: transmits the read program content (a resolution of 1920×1080 pixels) to the demultiplexer 132; performs the demultiplexing process to each data stream in the demultiplexer 132, the decode processes to the image data stream and the sound data stream in the image decoder 133 and the sound decoder 134, and the like; and outputs the image signal and the sound signal of the broadcast program through the image superimposition unit 161 and the sound selector 162 from the image display unit 163 and the speaker 164 (S1817).

Meanwhile, on the content-distribution confirmation screen 163*d*, when the user operates the cursor key and the OK key of the remote controller so as to select the "Yes" key in the selection-operation key 163*d*2 (S1807: Yes), processes at S1809 to S1816 are performed so that the image content (a resolution of 7680×4320 pixels) relating to the selected predetermined recording program is acquired from the service provider server 400. Incidentally, processes at S1809 to S1816 are the same as the processes at S1707 to S1714 in the operational sequence diagram illustrated in FIG. 17, and thus descriptions thereof will be omitted. Furthermore, the reception function execution unit 1102: transmits the acquired image content (a resolution of 7680×4320 pixels) to the demultiplexer 132; performs the demultiplexing process to each data stream in the demultiplexer 132, the decode processes to the image data stream and the sound data stream in the image decoder 133 and the sound decoder 134, and the like; and outputs the image signal and the sound signal of the broadcast program through the image superimposition unit 161 and the sound selector 162 from the image display unit 163 and the speaker 164 (S1817).

The recording-program playback process in the broadcast reception device 100 according to the present embodiment is achieved by the above operation. That is, the broadcast reception device 100 according to the present embodiment allows the user to appropriately select the program content having normal resolution stored in the storage of the broadcast reception device 100 and the image content having high resolution acquired from the service provider server 400 in viewing the predetermined recording program. That is, the broadcast reception device capable of the more useful recording process and playback process can be provided.

Also, in the process at S1809, credit card information 1406 is transmitted simultaneously with a login name 1404 and a password 1405 so that a charging process may be performed simultaneously with a user authentication process. In this manner, in viewing the predetermined recording program, the user can perform the recording-program playback process to the recording program with the program content having normal resolution stored in the storage of the broadcast reception device 100 free of charge and with the image content having high resolution acquired from the service provider server 400 pay.

In the foregoing, the examples for embodying the present invention have been described in reference to the first to sixth embodiments. Needless to say, however, the configurations of achieving techniques of the present invention are not limited to the above embodiments, and thus various modifications may be made. For example, a configuration according to an embodiment may be partially replaced with a configuration according to a different embodiment, or a configuration according to an embodiment may be added with a configuration according to a different embodiment. These entirely belong to the scope of the present invention. The numbers and the messages used in the descriptions and the figures, etc. are just exemplary, and thus the effect of the present invention is not influenced even when different cases are adopted.

Further, the operation of the scheduled recording process based on the scheduled information table stored in the scheduled-information storage area 1200 has been described as the operation of the recording process in each of the embodiments described above. Needless to say, however, a similar effect can be acquired even when the recording process is performed by the manual operation in viewing the broadcast program. Additionally, when the demultiplexer 132 and the image decoder 133, etc. appropriately perform the signal process after the image content is acquired from the service provider server 400, a process of anew storing the acquired image content into the recording-content storage area of the storage unit 110 may be simultaneously performed.

The functions etc. of the present invention described above may be partially or entirely achieved by hardware such as design of an integrated circuit. Also, the functions may be achieved by software in which a microprocessor unit etc. interpret and execute the operation programs for achieving the respective functions etc. The hardware and the software may be used together.

Incidentally, the software that controls the broadcast reception device 100 may be previously stored in the ROM 103 and/or the storage unit 110 of the broadcast reception device 100 when a product is shipped. After the product is shipped, the software may be acquired from the different application server 500 etc. on the Internet 200 through the LAN communication unit 121. Further, the software stored in a memory card, an optical disc, or the like may be acquired through the extended interface unit 124.

Also, control lines and information lines indicated in the figures are shown as those considered to be necessary for the descriptions, and all control lines and information lines of the product are not necessarily shown. In practice, almost all of the configurations may be considered to be mutually coupled.

REFERENCE SIGNS LIST

100 . . . broadcast reception device; 101 . . . main control unit; 102 . . . system bus; 103 . . . ROM; 104 . . . RAM; 110 . . . storage unit; 121 . . . LAN communication unit; 124 . . . extended interface unit; 131 . . . tuner/demodulator; 132 . . . demultiplexer; 133 . . . image decoder; 134 . . . sound decoder; 135 . . . subtitle decoder; 141 . . . data-broadcasting reception processing unit; 142 . . . data-broadcasting engine; 143 . . . application control unit; 144 . . . application engine; 151 . . . content processing unit; 161 . . . image superimposition unit; 162 . . . sound selector; 163 . . . image display unit; and 164 . . . speaker.

The invention claimed is:

1. An image display apparatus comprising:
a tuner configured to receive, via a broadcast wave, a first content of a broadcast program and program information related to the broadcast program;
a communication interface configured to communicate with a server via a Network and acquire a second content corresponding to the broadcast program;

a display configured to display the first content or the second content;

a storage configured to store information; and a controller, wherein in a storing processing of the broadcast program, the controller is configured to:

use program identification information and location information included in the program information of the broadcast program received by the tuner to perform control so as to store the program identification information and the location information, which are included in the program information, in the storage without acquiring the second content from the server, the program identification information identifying the broadcast program, and the location information indicating a location on the network of the server where the second content is stored, wherein in a play-back processing of the stored broadcast program, the controller is further configured to:

control the communication interface to communicate with the server in which the second content is stored via the communication interface using the location information stored in the storage and to acquire the second content from the server via the communication interface using the program identification information stored in the storage by the storing processing of the broadcast program; and control the display to display the second content acquired from the sever, and wherein when a user performs a content selection operation for playing back the stored broadcast program, the controller is further configured to display an information display, which includes a title and a mark of the broadcast program based on the program information of the stored broadcast program, on the display, the mark indicating that the second content is to be acquired from the server for playing back the stored broadcast program.

2. The image display apparatus according to claim 1, wherein on information display which is displayed on the display in performing an operation for playing back the stored broadcast program and is based on the program information of the stored broadcast program, a title of the broadcast program and a mark are displayed, the mark indicating acquirement of the second content from the server in playing back the stored broadcast program, and a thumbnail image of the second content is further displayed.

3. The image display apparatus according to claim 1, wherein the storage is further configured to store identification information necessary for accessing the server, wherein the controller is further configured to perform control so as to transmit the authentication identification information stored in the storage to a server identified from the address information in playing back the stored broadcast program.

4. The image display apparatus according to claim 1, wherein in playing back the stored broadcast program, the controller is further configured to perform the control so as to cause the display to display a distribution confirmation screen and receive the second content from the server based on a selection operation with respect to the distribution confirmation screen of the stored broadcast program.

5. The image display apparatus according to claim 1, wherein the controller is further configured to control so that playback of the stored broadcast program is capable of being played back after broadcast of the broadcast program ends.

6. A content playing back method comprising:

receiving, by a tuner, a first content of a broadcast program and program information related to the broadcast program via a broadcast wave;

controlling, by a controller, a storing processing of the broadcast program which includes a process of storing program identification information and location information included in the program information received by the tuner in a storage;

wherein the program identification information identifies the broadcast program, and the location information indicates a location on the network of a server where a second content is stored;

controlling, by the controller, a play-back processing of the broadcast program stored by the storing processing of the broadcast program, as follows: communicating with the server in which the second content is stored via the communication interface using the location information stored in the storage, and acquiring the second content from the server via the communication interface using the program identification information stored in the storage;

displaying the second content acquired from the sever on a display; and wherein when a user performs a content selection operation for playing back the broadcast program stored by the storing processing of the broadcast program, on information display displayed on the display, a title of the broadcast program based on the program information of the broadcast program stored by the storing processing of the broadcast program and a mark are displayed, the mark indicating that the second content is to be acquired from the server for playing back the second content broadcast program stored by the storing processing of the broadcast program.

* * * * *